United States Patent

Matsunaga et al.

[11] Patent Number: 5,955,234
[45] Date of Patent: Sep. 21, 1999

[54] TONER FOR DEVELOPING ELECTROSTATIC IMAGE, AND IMAGE FORMING METHOD

[75] Inventors: Satoshi Matsunaga, Mishima; Manabu Ohno; Tadashi Doujo, both of Numazu, all of Japan

[73] Assignee: Canon Kabushiki Kaisha, Tokyo, Japan

[21] Appl. No.: 08/947,273

[22] Filed: Oct. 8, 1997

[30] Foreign Application Priority Data

Oct. 9, 1996 [JP] Japan .................................... 8-268299

[51] Int. Cl.⁶ .................................................. G03G 9/087
[52] U.S. Cl. ............................................. 430/110; 430/126
[58] Field of Search ................................... 430/106, 109, 430/110, 111, 126

[56] References Cited

U.S. PATENT DOCUMENTS

| | | | |
|---|---|---|---|
| 2,297,691 | 10/1942 | Carlson | 95/5 |
| 5,066,727 | 11/1991 | Aizawa et al. | 525/296 |
| 5,514,511 | 5/1996 | Iwamoto et al. | 430/110 |
| 5,571,652 | 11/1996 | Asano et al. | 430/110 |
| 5,578,408 | 11/1996 | Kohtaki et al. | 430/106.6 |
| 5,707,771 | 1/1998 | Matsunaga | 430/110 |

FOREIGN PATENT DOCUMENTS

| | | |
|---|---|---|
| 0354466 | 2/1990 | European Pat. Off. . |
| 0516153 | 12/1992 | European Pat. Off. . |
| 0718703 | 6/1996 | European Pat. Off. . |
| 42-23910 | 11/1967 | Japan . |
| 43-24748 | 10/1968 | Japan . |
| 1-128071 | 5/1989 | Japan . |
| 4-353866 | 12/1992 | Japan . |
| 6-59504 | 3/1994 | Japan . |
| 7-224103 | 8/1995 | Japan . |
| 8-224480 | 9/1996 | Japan . |
| 2232160 | 12/1990 | United Kingdom . |

OTHER PUBLICATIONS

Macromolecule Papers, vol. 46 (2) pp. 81–97.
Suyama et al, Initiation Mechanism for Polymerization of Styrene and Methyl Methacrylate with 1,1–Bis(butyldioxy-)cyclohexane, Polymer Journal, vol. 24, No. 9, pp. 971–977 (1992).

*Primary Examiner*—John Goodrow
*Attorney, Agent, or Firm*—Fitzpatrick, Cella, Harper & Scinto

[57] ABSTRACT

A toner for developing an electrostatic image is comprised of a binder resin, a colorant and a wax. The toner has the following rheological characteristics: (a) a temperature at which the ratio of a loss elastic modulus to a storage elastic modulus ($G''/G'=\tan \delta$) comes to be 1.0 is present in a temperature range of from 55° C. to 70° C., with an elastic modulus being $1.5 \times 10^8$ Pa or below; (b) the ratio of the storage elastic modulus at a temperature of 40° C. ($G'_{40}$) to the storage elastic modulus at a temperature of 50° C. ($G'_{50}$), $G'_{40}/G'_{50}$, is from 1.5 to 5.0; (c) the ratio of the storage elastic modulus at a temperature of 50° C. ($G'_{50}$) to the storage elastic modulus at a temperature of 60° C. ($G'_{60}$), $G'_{50}/G'_{60}$, is from 3 to 20; (d) the ratio of the storage elastic modulus at a temperature of 70° C. ($G'_{70}$) to the storage elastic modulus at a temperature of 100° C. ($G'_{100}$), $G'_{70}/G'_{100}$, is from 50 to 250; and (e) the ratio of the storage elastic modulus at a temperature of 110° C. ($G'_{110}$) to the storage elastic modulus at a temperature of 140° C. ($G'_{140}$), $G'_{110}/G'_{140}$, is from 2 to 20.

68 Claims, 8 Drawing Sheets

TONER FOR DEVELOPING ELECTROSTATIC IMAGE, AND IMAGE FORMING METHOD

BACKGROUND OF THE INVENTION

1. Field of the Invention

This invention relates to a toner for developing an electrostatic image, used in image forming processes such as electrophotography, electromagnetic recording or electrostatic printing, and an image forming method making use of such a toner.

2. Related Background Art

A number of methods as disclosed in U.S. Pat. No. 2,297,691, Japanese Patent Publication No. 42-23910 and No. 43-24748 and so forth are conventionally known in electrophotography. In general, images are obtained by forming an electrostatic image on a photosensitive member by utilizing a photoconductive material and by various means, subsequently developing the electrostatic image by the use of a toner to form a toner image, and transferring the toner image to a recording medium such as paper if necessary, followed by fixing by the action of heat, pressure, heat-and-pressure or solvent vapor. Thus, the toner image is fixed on the recording medium to form a fixed image.

Various methods or apparatus have been developed for the above final step, i.e., the step of fixing a toner image to a recording medium such as paper. A method most commonly used at present employs a pressure heating system making use of a heating roller or a stationary heating element provided through a heat-resistant film.

In the pressure heating system making use of a heating roller, fixing is carried out by causing a recording medium toner-fixing sheet to pass through a heating roller whose surface is formed of a material having releasability to toner while the surface of the recording medium, on which a toner image is formed, is brought into contact with the surface of the heating roller under pressure. Since in this method the surface of the heating roller comes into contact with the toner image on the recording medium under pressure, a very good thermal efficiency can be achieved when the toner image is fixed onto the recording medium, so that fixing can be carried out rapidly.

In this method, since the surface of the heating roller comes into contact with the toner image under pressure in the molten state, part of the toner image may adhere and transfer to the surface of the fixing roller, which may re-transfer to subsequent recording medium to cause an "offset phenomenon", and to get the recording medium dirty. This phenomenon is greatly affected by fixing speed and fixing temperature. In general, in the case of a low fixing speed, the surface temperature of the heating roller is set relatively low, and, in the case of a high fixing speed, the surface temperature of the heating roller is set relatively high. This intends that a quantity of heat supplied from the heating roller to the toner in order to fix the toner can be substantially kept constant independent of the fixing speed.

The toner on the recording medium forms several toner layers. In particular, especially in a system where the fixing speed is high and the heating roller has a high surface temperature, there is a great difference in temperature between the upper-most toner layer coming in contact with the heating roller and the lower-most toner layer coming in contact with the recording medium. Therefore, when the heating roller has a high surface temperature, the toner of the upper-most layer tends to cause the offset phenomenon and, when the heating roller has a low surface temperature, the toner of the lower-most layer does not melt well and hence the toner tends to be not fixed to the recording medium to cause a phenomenon called "low-temperature offset".

As a means for solving this problem, in high-speed fixing, a method is conventionally used in which the pressure at the time of fixing is made higher to anchor the toner to the recording medium. This method enables the heating roller temperature to lower to a certain level, inhibiting high-temperature offset of the upper-most toner layer. However, the shear force applied to the toner is so great that the recording medium may wind around the fixing roller to cause wind-around offset, or separation marks of separating claws for separating the recording medium from the fixing roller tend to appear on fixed images. In addition, because of high pressure, line images tend to be crushed at the time of fixing or the toner may scatter to damage the image quality of fixed images.

In the high-speed fixing, it is common to use a toner having a lower melt viscosity than in the case of low-speed fixing and to make the heating roller operate at a lower surface temperature and at a lower fixing pressure so that toner images can be fixed while preventing the high-temperature offset and wind-around offset. However, if such a toner having a low melt viscosity is used in low-speed fixing, the offset phenomenon tends to occur at high temperature.

It is sought to provide a toner which has a fixing temperature range broad enough to be applicable even in high-speed fixing as well as in low-speed fixing, superior anti-offset properties, and good fixing performance for various types of transfer-receiving papers inclusive of reclaimed paper.

As toners are made to have smaller particle diameters, the resolution and definition (or sharpness) of images are improved, but on the other hand the fixing performance may lower at halftone areas formed of the toner having smaller particle diameters. This phenomenon is remarkable especially in the high-speed fixing. This is because the toner is laid in a smaller amount at the halftone areas and hence the toner transferred to concave areas of the recording medium is supplied with heat in a smaller quantity from the heating roller, and also because the pressure applied to the concave areas is held back by convex areas. The toner transferred to the convex areas of the recording medium at the halftone areas is so thin in its layer thickness that the shear force applied to the toner per each particle is larger than that at solid black areas having a large toner layer thickness, so that the offset phenomenon tends to occur and the fixed images tend to have a low image quality.

Japanese Patent Application Laid-open No. 1-128071 discloses a toner for electrophotography, employing polyester resin as a binder resin and having a specific storage elastic modulus at 95° C., but it still needs to be improved in fixing performance and anti-offset properties.

Japanese Patent Application Laid-open No. 4-353866 discloses a toner for electrophotography, having such rheological characteristics that its storage elastic modulus begins to fall at a temperature ranging from 100 to 110° C., a specific storage elastic modulus is held at 150° C. and the peak temperature of its loss elastic modulus is 125° C. or above. However, both the storage elastic modulus and the loss elastic modulus are both too small and also the peak temperature of the loss elastic modulus is too high to improve low-temperature fixing performance, and the storage elastic modulus and the loss elastic modulus are both too low to achieve a high thermal resistance.

Japanese Patent Application Laid-open No. 6-59504 discloses a toner for electrophotography, employing as a binder resin a polyester resin having a specific structure, a specific storage elastic modulus at 70 to 120° C. and a specific loss elastic modulus at 130 to 180° C. However, the storage elastic modulus at 70 to 120° C. is so large, and the loss elastic modulus at 130 to 180° C. is so small, that the toner is difficult to fix at low temperatures when it is a magnetic toner having small particle diameters, and also its anti-offset properties need to be improved.

Japanese Patent Application Laid-open No. 7-224103 discloses a process for producing a high-molecular weight resin used as a resin for toners, employing a polymerization initiator having two peroxide groups in a molecule. However, since only a high-molecular weight resin can be produced, the low-temperature fixing performance of the toner is not improved.

Macromolecule Papers, Vol. 46 (2), pp.81–87, reports synthesis of fluorine-containing block copolymer using a polymeric peroxide. Polymer Journal 24,971 (1992) reports reaction mechanism of radical polymerization initiator having two peroxide groups in a molecule.

In an instance where magnetic toners having small particle diameters contain a magnetic material in a large quantity, the problem on fixing performance is remarkable. From the viewpoint of rheology, an increase of a colorant contained in the toner tends to cause an increase in storage elastic modulus and loss elastic modulus, and the fixing performance may become poor depending on the paper used, thus an improvement is desired.

Japanese Patent Application Laid-open No. 8-234480 (corresponding to EP-A 0718703) discloses a toner in which storage elastic modulus at a temperature of 100° C. ($G'_{100}$) and the ratio of storage elastic modulus at a temperature of 60° C. ($G'_{60}$) to storage elastic modulus at a temperature of 70° C. ($G'_{70}$), $G'_{60}/G'_{70}$, are specified.

This toner, on account of its viscoelastic properties, rapidly melts when heat is supplied from a fixing assembly at the time of fixing in an amount not less than a predetermined amount, and is firmly anchored to and fixed on a transfer-receiving medium. With regard to anti-blocking properties, it has a sufficiently high storage elastic modulus even at a temperature near to the glass transition temperature (Tg) measured using a differential scanning calorimeter (DSC), and hence, rarely agglomerates and deforms when left for a long time in a high-temperature environment. Thus, it has superior fixing performance and anti-blocking properties and also can achieve superior fixing performance even in such a state that in the cold season a lower roller is not well heated immediately after turning on a switch. However, when images are fixed on thick recording mediums such as a transfer-receiving paper of 80 g/m$^2$ or 120 g/m$^2$, heat from the lower roller (pressure roller) is absorbed by the recording medium. Hence, especially when images are fixed under fixing conditions of a high fixing speed, heat is not sufficiently and uniformly imparted to the toner, tending to cause a lowering of fixing performance and a decrease in the image density of fixed images. Thus, there is room for further improvement.

SUMMARY OF THE INVENTION

An object of the present invention is to provide a toner for developing an electrostatic image and an image forming method which have solved the problems discussed above.

Another object of the present invention is to provide a toner for developing an electrostatic image, that can show good fixing performance even when the toner is made to have smaller particle diameters and concurrently therewith its colorant (in particular, magnetic material) becomes contained in a larger quantity; and an image forming method making use of such a toner.

Still another object of the present invention is to provide a toner for developing an electrostatic image, that can be well fixed to transfer-receiving papers of various types of paper inclusive of reclaimed paper; and an image forming method making use of such a toner.

A further object of the present invention is to provide a toner for developing an electrostatic image, that can be well adapted even to high-speed copying machines as well as to low-speed copying machines, and can enjoy good fixing performance and superior anti-offset properties, anti-blocking properties and fluidity; and an image forming method making use of such a toner.

A still further object of the present invention is to provide a toner for developing an electrostatic image, that can show a superior fixing performance even at halftone areas and also can obtain fixed images with a good image quality; and an image forming method making use of such a toner.

A still further object of the present invention is to provide a toner for developing an electrostatic image, that can produce copied images free of fog and with a high density when used even in high-speed copying machines as well as in low-speed copying machines; and an image forming method making use of such a toner.

A still further object of the present invention is to provide a toner for developing an electrostatic image, that has a good fixing performance even for thick transfer-receiving papers of 80 g/m$^2$ or more, and has a good fixing performance even when toner images are fixed at a higher speed and on thicker transfer-receiving papers of 120 g/m$^2$ or more.

In order to achieve the above objects, the present invention provides a toner for developing an electrostatic image, comprising;

a binder resin, a colorant and a wax, wherein;
the toner has the following rheological characteristics:
(a) a temperature at which the ratio of a loss elastic modulus to a storage elastic modulus (G"/G'=tan δ) comes to be 1.0 is present in a temperature range from 55° C. to 70° C., with an elastic modulus being $1.5 \times 10^8$ Pa or below;
(b) the ratio of the storage elastic modulus at a temperature of 40° C. ($G'_{40}$) to the storage elastic modulus at a temperature of 50° C. ($G'_{50}$), $G'_{40}/G'_{50}$, is from 1.5 to 5.0;
(c) the ratio of the storage elastic modulus at a temperature of 50° C. ($G'_{50}$) to the storage elastic modulus at a temperature of 60° C. ($G'_{60}$), $G'_{50}/G'_{60}$, is from 3 to 20;
(d) the ratio of the storage elastic modulus at a temperature of 70° C. ($G'_{70}$) to the storage elastic modulus at a temperature of 100° C. ($G'_{100}$), $G'_{70}/G'_{100}$, is from 50 to 250; and
(e) the ratio of the storage elastic modulus at a temperature of 110° C. ($G'_{110}$) to the storage elastic modulus at a temperature of 140° C. ($G'_{140}$), $G'_{110}/G'_{140}$ is from 2 to 20.

The present invention also provides an image forming method comprising;

developing an electrostatic latent image held on an electrostatic latent image bearing member, by the use of a toner to form a toner image;

transferring the toner image to a recording medium; and heat-fixing the toner image transferred to the recording medium, by means of a heat fixing means;

wherein;

the toner comprises a binder resin, a colorant and a wax, and the toner has the following rheological characteristics:

(a) a temperature at which the ratio of a loss elastic modulus to the storage elastic modulus (G"/G'=tan δ) comes to be 1.0 is present in a temperature range of from 55° C. to 70° C., with an elastic the modulus being $1.5 \times 10^8$ Pa or below;

(b) the ratio of the storage elastic modulus at a temperature of 40° C. ($G'_{40}$) to the storage elastic modulus at a temperature of 50° C. ($G'_{50}$), $G'_{40}/G'_{50}$, is from 1.5 to 5.0;

(c) the ratio of the storage elastic modulus at a temperature of 50° C. ($G'_{50}$) to the storage elastic modulus at a temperature of 60° C. ($G'_{60}$), $G'_{50}/G'_{60}$, is from 3 to 20;

(d) the ratio of the storage elastic modulus at a temperature of 70° C. ($G'_{70}$) to the storage elastic modulus at a temperature of 100° C. ($G'_{100}$), $G'_{70}/G'_{100}$, is from 50 to 250; and (e) the ratio of the storage elastic modulus at a temperature of 110° C. ($G'_{110}$) to the storage elastic modulus at a temperature of 140° C. ($G'_{140}$), $G'_{110}/G'_{140}$, is from 2 to 20.

DESCRIPTION OF THE PREFERRED EMBODIMENTS

Figure 1:
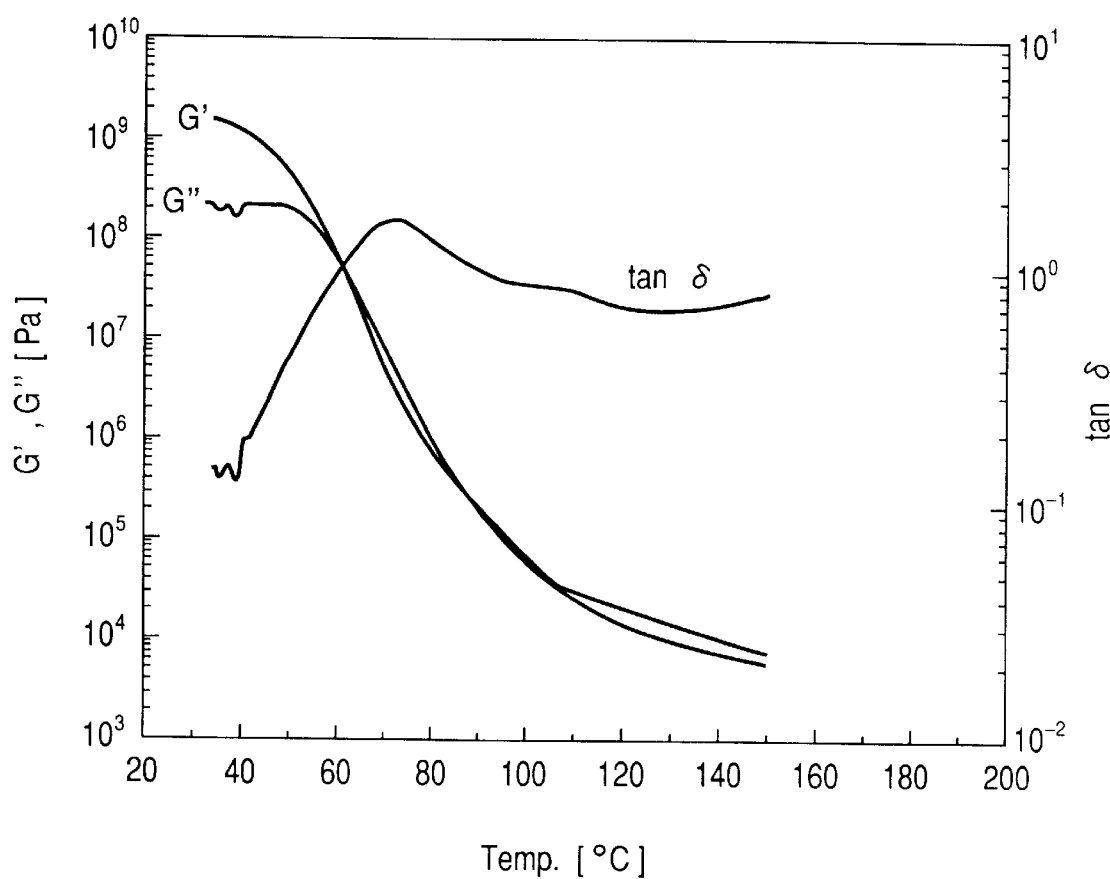
FIG. 1 is a graph showing rheological characteristics of the toner of the present invention.

According to the studies made by the present inventors, it is important to use a binder resin or toner having specific rheological characteristics, in order to obtain a toner that can achieve good fixing performance and good anti-blocking properties at the same time, can show a good fixing performance immediately after turning on a copying machine even in the cold season and also can show a good fixing performance on thick recording mediums even at a high fixing speed when toner images formed using a toner containing a colorant (in particular, magnetic material) in a larger quantity and made to have smaller particle diameters are fixed by means of a heat-roll fixing assembly.

The rheological characteristics conventionally known are concerned with the fixing performance in such a state that a transfer-receiving paper having a relatively small thickness is used and the whole transfer-receiving paper is evenly heated when passed through a fixing assembly. Thus, it is desired to improve the fixing performance in such a state that it is difficult for the whole transfer-receiving paper to be evenly heated when passed through a fixing assembly, as in the case where a transfer paper having a large thickness is used.

In the toner of the present invention, a temperature at which the ratio of a loss elastic modulus to a storage elastic modulus (G"/G'=tan δ) comes to be 1.0 is present in a temperature range of from 55° C. to 70° C., and also an elastic modulus at such temperature is $1.5 \times 10^8$ or below.

According the studies made by the present inventors, the temperature at which the ratio G'/G" comes to be 1.0 is a matter of course when the physical meaning of G' and G" is taken into consideration, but it is a temperature at which the binder resin contained in the toner substantially begins to undergo thermal deformation, and the modulus of elasticity at such temperature shows the extent of the thermal deformation. The temperature at which the ratio G'/G" comes to be 1.0 is present in a temperature range from 55° C. to 70° C., preferably from 58° C. to 68° C., and more preferably from 59° C. to 65° C., and the elastic modulus at such temperature is $1.5 \times 10^8$ or below, preferably from $3 \times 10^7$ Pa to $1.3 \times 10^8$ Pa, and more preferably from $3 \times 10^7$ Pa to $1.0 \times 10^8$ Pa.

If the temperature at which the ratio G'/G" comes to be 1.0 is present at a temperature lower than 55° C., the storage properties of the toner may be damaged, and at a temperature higher than 70° C., the fixing performance of the toner may be damaged. An instance where the modulus of elasticity at the temperature at which the ratio G'/G" comes to be 1.0 is higher than $1.5 \times 10^8$ is not preferable because the fixing performance may be damaged independent of temperature.

The ratios $G'_{40}/G'_{50}$, $G'_{50}/G'_{60}$ $G'_{70}/G'_{100}$ and $G'_{110}/G'_{140}$ each show the temperature dependence of the storage elastic modulus when the binder resin contained in the toner is substantially in a glassy state, in a glass-transitional state and in a molten state. According to the studies made by the present inventors, this closely correlates with the fixing performance of toners. More specifically, in order for a toner to undergo thermal deformation to surely fix when a toner present on a transfer-receiving paper is passed through the fixing assembly and heat-fixed, it is necessary to smoothly effect a series of phase changes which the binder resin contained in the toner undergoes from the glassy state to the glass-transitional state and further to the molten state. Such changes in the state of the binder resin can be known by measuring the temperature dependence of the storage elastic modulus. When the binder resin standing glassy has no or slight temperature dependence of the storage elastic modulus, the shift from the glassy state to the glass-transitional state and further to the molten state appears as abrupt changes in the storage elastic modulus, and the toner is greatly affected by any delicate temperature fluctuation of the fixing assembly from the view point of the fixing of toners, and, when different kinds of transfer-receiving papers are used, greatly affected by any difference in heat transfer speed that is ascribable to the difference between transfer-receiving papers. Thus, in an extreme case, only the toner melts which is present as the outer-most layer on a transfer-receiving paper and comes into contact with the fixing roller, and the lower layer toner does not melt at all and is not substantially fixed.

In the present invention, $G'_{40}/G'_{50}$ may be from 1.5 to 5.0, preferably from 1.8 to 4.0, and more preferably from 2.0 to 3.5. If $G'_{40}/G'_{50}$ is less than 1.5, the toner having a stable fixing performance may not be obtained, and if $G'_{40}/G'_{50}$ is more than 5.0, the storage properties of the toner may be damaged, thus such ratios are not preferable.

In the present invention, $G'_{50}/G'_{60}$ may be from 3 to 20, preferably from 4 to 15, and more preferably from 5 to 10. If $G'_{50}/G'_{60}$ is less than 3, the fixing performance may become poor when a transfer-receiving paper having a large thickness of 100 g/m² or more is used, and if $G'_{50}/G'_{60}$ is more than 20, the storage properties of the toner may be damaged, thus such ratios are not preferable.

In the present invention, $G'_{70}/G'_{100}$ may be from 50 to 250, preferably from 60 to 240, and more preferably from 70 to 220. If $G'_{70}/G'_{100}$ is less than 50, the fixing performance may become poor when a transfer-receiving paper having a large thickness of 100 g/m² or more is used, and if $G'_{70}/G'_{100}$ is more than 250, hot offset may occur when a transfer-receiving paper having a small thickness of 45 g/m² or less is used, thus such ratios are not preferable.

In the present invention, $G'_{110}/G'_{140}$ may be from 2 to 20, preferably from 2.5 to 18, and more preferably from 3 to 15. If $G'_{110}/G'_{140}$ is less than 2, no sufficient fixing performance may be achieved when a transfer-receiving paper having a large thickness of 100 g/m² or more is used, and if $G'_{110}/G'_{140}$ is more than 20, the hot offset may occur even when a transfer-receiving paper having a large thickness of 100 g/m² or more is used, thus such ratios are not preferable.

In the present invention, the binder resin of the toner having the above specific rheological characteristics may preferably contain a block copolymer having an aromatic vinyl monomer unit and an acrylate or methacrylate monomer unit.

This block copolymer may be contained in the toner in an amount not less than 10% by weight, preferably not less than 25% by weight, and more preferably not less than 45% by weight, based on the total weight of the binder resin.

This block copolymer includes the following four forms.

(i) A block copolymer having a block constituted of an aromatic vinyl monomer unit alone and a block constituted of an acrylate or methacrylate monomer unit alone.

(ii) A block copolymer having a block constituted of an aromatic vinyl monomer unit and an acrylate or methacrylate monomer unit and a block constituted of an acrylate or methacrylate monomer unit alone.

(iii) A block copolymer having a block constituted of an aromatic vinyl monomer unit and an acrylate or methacrylate monomer unit and a block constituted of an aromatic vinyl monomer unit alone.

(iv) A block copolymer having a block constituted of an aromatic vinyl monomer unit and an acrylate or methacrylate monomer unit and a block constituted of an aromatic vinyl monomer unit and an acrylate or methacrylate monomer unit.

Such aromatic vinyl/acrylate or methacrylate block copolymers can be synthesized by subjecting an aromatic vinyl monomer and an acrylate or methacrylate monomer to radical polymerization during which the polymerization temperature is changed at least by 5° C., preferably 7° C., more preferably 10° C., in the presence of a radical polymerization initiator having at least two peroxide groups in a molecule and having a difference of at least 5° C., preferably at least 7° C., and more preferably at least 10° C., in 10-hour half-life temperature at which the cleavage reaction of each peroxide group takes place.

Such a radical polymerization initiator having at least two peroxide groups may include compounds represented by the following chemical formulas (1) to (4).

(1)

(2)

(3)

(4)

In the formulas, $R_1$ to $R_{12}$ each represent a straight-chain, branched or cyclic alkyl group having 2 to 30 carbon atoms or an aryl group having 6 to 20 carbon atoms, and may be the same with or different from one another; k and n each represent an integer of 2 to 50; and m represents an integer of 1 to 20.

The radical polymerization initiator represented by the chemical formula (1) may include, e.g., the following exemplary compounds (1-1) to (1-4).

Exemplary compound (1-1)
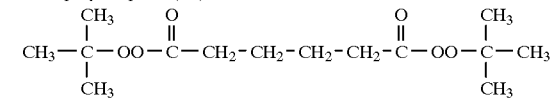

Exemplary compound (1-2)
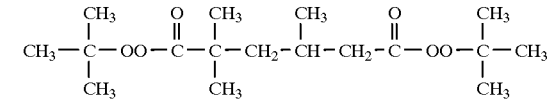

Exemplary compound (1-3)
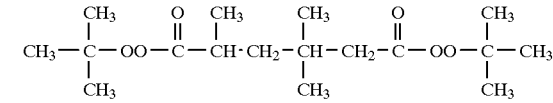

Exemplary compound (1-4)
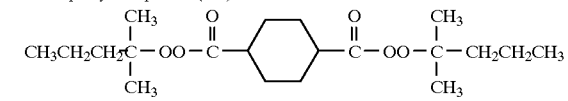

The radical polymerization initiator represented by the chemical formula (2) may include, e.g., the following exemplary compounds (2-1) to (2-7). Exemplary compound (2-1)

Exemplary compound (2-1)
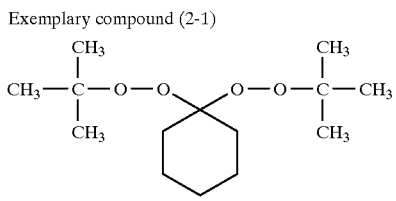

-continued

Exemplary compound (2-2)

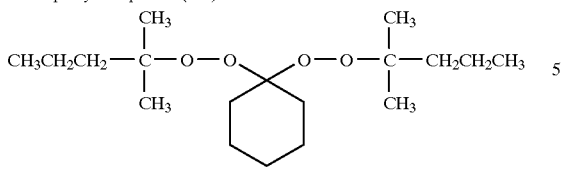

Exemplary compound (2-3)

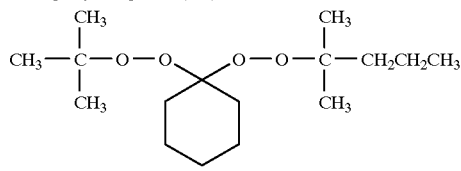

Exemplary compound (2-4)

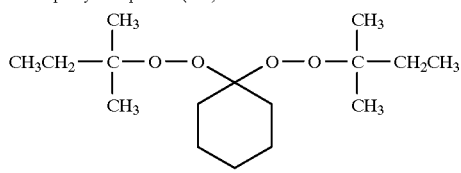

Exemplary compound (2-5)

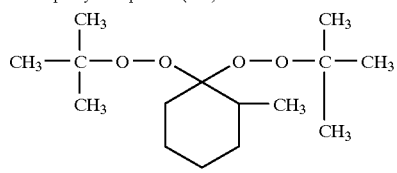

Exemplary compound (2-6)

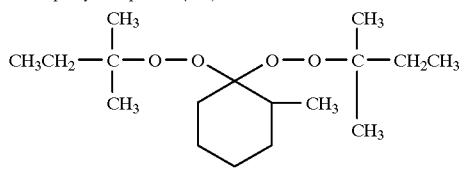

Exemplary compound (2-7)

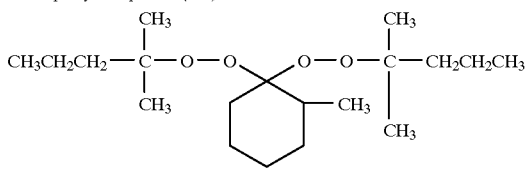

The radical polymerization initiator represented by the chemical formula (3) may include, e.g., the following exemplary compounds (3-1) to (3-5). Exemplary compound (3-1)

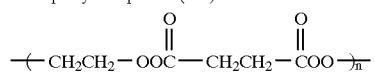

Exemplary compound (3-2)

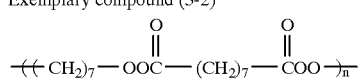

Exemplary compound (3-3)

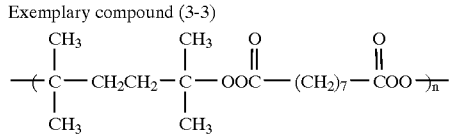

-continued

Exemplary compound (3-4)

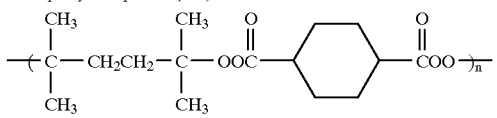

Exemplary compound (3-5)

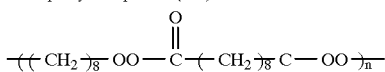

The radical polymerization initiator represented by the chemical formula (4) may include, e.g., the following exemplary compounds (4-1) to (4-3). Exemplary compound (4-1)

Exemplary compound (4-2)

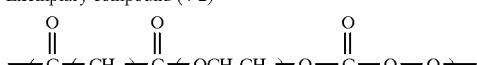

Exemplary compound (4-3)

When a polymer is produced using any of the radical polymerization initiators represented by the chemical formulas (1) to (4) (hereinafter often "polymerization initiator according to the present invention"), the initiator may be used in an amount from 0.01 parts by weight to 10 parts by weight based on 100 parts by weight of the total monomers.

Any of the polymerization initiators represented by the chemical formulas (1) to (4) may be used in a combination of two or more, or may be used in combination with any of the following radical polymerization initiators.

The radical polymerization initiators usable in combination with any of the polymerization initiators represented by the chemical formulas (1) to (4) may include, e.g., 2,2'-azobisisobutyronitrile, 2,2'-azobis(4-methoxy-2,4-dimethylvaleronitrile, 2,2'-azobis(2,4-dimethylvaleronitrile, 2,2'-azobis(2-methylbutyronitrile, dimethyl-2,2'-azobisisobutyrate, 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, 2,2'-azobis(2-methylpropane), ketone peroxides such as methyl ethyl ketone peroxide, acetyl acetone peroxide and cyclohexanone peroxide, 2,2-bis(t-butylperoxy)butane, t-butyl hydroperoxide, cumene hydroperoxide, 1,1,3,3-tetramethylbutyl hydroperoxide, di-t-butyl peroxide, t-butylcumyl peroxide, dicumyl peroxide, α, α'-bis(t-butylperoxyisopropyl)benzene, isobutyl peroxide, octanoyl peroxide, decanoyl peroxide, lauroyl peroxide, 3,5,5-trimethylhexanoyl peroxide, benzoyl peroxide, m-trioyl peroxide, di-isopropyl peroxydicarbonate, di-2-ethylhexyl peroxydicarbonate, di-n-propyl peroxydicarbonate, di-2-ethoxyethyl peroxydicarbonate, di-methoxyisopropyl peroxydicarbonate, di(3-methyl-3-methoxybutyl) peroxycarbonate, acetylcyclohexylsulfonyl peroxide, t-butyl peroxyacetate, t-butyl peroxyisobutyrate, t-butyl peroxyneodecanoate, t-butyl peroxy-2-ethylhexanoate, t-butyl peroxylaurate, t-butyl peroxybenzoate, t-butyl peroxyisopropylcarbonate, di-t-butyl peroxyisophthalate, t-butyl peroxyallylcarbonate, t-amyl peroxy-2- ethylhexanoate, di-t-butyl peroxyhexahydroterephthalate, and di-t-butyl peroxyazelate.

Of these polymerization initiators, those preferably used may specifically include organic peroxides such as benzoyl peroxide, n-butyl-4,4-di(t-butylperoxy)valerate, dicumyl peroxide, α, α'-bis(t-butylperoxydiisopropyl)benzene, t-butyl peroxycumene and di-t-butyl peroxide, and azo or diazo compounds such as azobisisobutyronitrile and diazoaminobenzene.

The polymerization initiator according to the present invention has at least two peroxide groups in a molecule, and, when the temperature at which the cleavage reaction of each peroxide group takes place is expressed as 10-hour half-life temperature (hereinafter "reaction temperature"), has a temperature difference of at least 5° C., preferably at least 7° C., and more preferably at least 10° C., between the reaction temperature of a first peroxide group (hereinafter "reaction temperature 1") and the reaction temperature of a second peroxide group (hereinafter "reaction temperature 2"). If the temperature difference is less than 5° C., the polymer produced may be substantially a random copolymer and make it difficult to exhibit the specific viscoelastic behavior inherent in the toner of the present invention.

To produce the polymer using the polymerization initiator according to the present invention, when roughly grouped, the following two processes are available.

1) An aromatic vinyl monomer alone or a monomer composition prepared by mixing an aromatic vinyl monomer with an acrylate or methacrylate monomer in a weight ratio of from 20:1 to 1:1 is mixed with the polymerization initiator according to the present invention, followed by polymerization at a reaction temperature arbitrarily selected within ±20° C. on the basis of the reaction temperature 1. Next, an acrylate or methacrylate monomer alone or a monomer composition prepared by mixing an acrylate or methacrylate monomer with an aromatic vinyl monomer in a weight ratio of from 20:1 to 1:1 is added, followed by polymerization at a temperature at least 5° C. higher than the reaction temperature at the first stage.

2) An acrylate or methacrylate monomer alone or a monomer composition prepared by mixing an acrylate or methacrylate monomer with an aromatic vinyl monomer in a weight ratio of from 20:1 to 1:1 is mixed with the polymerization initiator according to the present invention, followed by polymerization at a reaction temperature arbitrarily selected within ±20° C. on the basis of the reaction temperature 1. Next, an aromatic vinyl monomer alone or a monomer composition prepared by mixing an aromatic vinyl monomer with an acrylate or methacrylate monomer monomer in a weight ratio of from 20:1 to 1:1 is added, followed by polymerization at a temperature at least 5° C. higher than the reaction temperature at the first stage.

When any of the polymerization initiators represented by the chemical formulas (1) to (4) is used in a combination of two or more, the polymer can be produced at two or more points of reaction temperatures on the basis of the reaction temperature 1 and reaction temperature 2 of each polymerization initiator.

The binder resin of the toner of the present invention may have a glass transition temperature from 40° C. to 80° C., preferably from 45° C. to 85° C., and more preferably from 55° C. to 70° C. The binder resin of the toner of the present invention may preferably have a number average molecular weight (Mn) of from 2,500 to 50,000, and more preferably from 3,000 to 20,000. The binder resin of the toner of the present invention may preferably have a weight average molecular weight (Mw) from 10,000 to 1,500,000, and more preferably from 25,000 to 1,250,000.

If the binder resin of the toner of the present invention has a glass transition temperature lower than 40° C., although the low-temperature fixing performance of the toner is a little improved, the anti-blocking properties may become poor, and if higher than 80° C., the low-temperature fixing performance of the toner may become extremely poor, thus such glass transition temperatures are not preferable.

If the binder resin of the toner of the present invention has a number average molecular weight (Mn) less than 2,500 or a weight average molecular weight (Mw) less than 10,000, the anti-offset properties and/or anti-blocking properties may become poor in either case, and if it has a number average molecular weight (Mn) more than 50,000 or a weight average molecular weight (Mw) more than 1,500,000, the low-temperature fixing performance may become poor in either case. Thus, such molecular weights are not preferable.

The toner of the present invention may preferably have a peak in each of a low-molecular weight region from 12,000 to 40,000, preferably from 13,000 to 38,000, and more preferably from 15,000 to 35,000 and a high-molecular weight region from 50,000 to 1,200,000, preferably from 80,000 to 1,100,000, and more preferably from 100,000 to 1,000,000, in molecular weight distribution as measured by gel permeation chromatography (GPC) of a filtrate (THF-soluble matter) obtained from a solution prepared by dissolving the toner in tetrahydrofuran (THF). It is particularly preferred that the peak present in the molecular weight region from 12,000 to 40,000 is a main peak.

If in the molecular weight distribution as measured by GPC of the THF-soluble matter of the toner, a peak is present in the low-molecular weight region from 12,000 to 40,000, but no peak is present in the high-molecular weight region from 50,000 to 1,200,000 and a peak is present in the molecular weight region more than 40,000 and less than 50,000, then there is a possibility of a little improvement in the low-temperature fixing performance, but the anti-offset properties may become poor. If a peak is present in the low-molecular weight region from 12,000 to 40,000, but no peak is present in the high-molecular weight region of from 50,000 to 1,200,000 and a peak is present in the region exceeding 1,200,000, then there is a possibility of an improvement in the anti-offset properties, but the low-temperature fixing performance may become poor. Thus, such instances are not preferable.

If in the molecular weight distribution as measured by GPC of the THF-soluble matter of the toner, a peak is present in the high-molecular weight region from 50,000 to 1,200,000, but no peak is present in the low-molecular weight region from 12,000 to 40,000 and a peak is present in the molecular weight region less than 12,000, then there is a possibility of a little improvement in the low-temperature fixing performance, but both of the anti-blocking properties and the anti-offset properties may become poor. If a peak is present in the high-molecular weight region from 50,000 to 1,200,000, but no peak is present in the low-molecular weight region from 12,000 to 40,000 and a peak is present in the region of from more than 40,000 to less than 50,000, then there is a possibility of an improvement in the anti-offset properties, but the low-temperature fixing performance may be damaged. Thus, such instances are not preferable.

If in the molecular weight distribution as measured by GPC of the THF-soluble matter of the toner, a peak is present only in the low-molecular weight region from 12,000 to 40,000, the anti-offset properties may be seriously damaged, and if a peak is present only in the high-molecular weight region from 50,000 to 1,200,000, the fixing performance may be damaged. Thus, such instances are not preferable.

In the present invention, in the molecular weight distribution as measured by GPC of the THF-soluble matter of the toner, the ratio of the area (L) of a low-molecular weight region not more than 45,000 to the area (H) of a high-molecular weight region more than 45,000, (L):(H), may be in the range from 1:9 to 9.5:0.5, preferably from 2:8 to 9:1, and more preferably from 3:7 to 8.5:1.5.

In this area ratio, if the high-molecular weight region (H) is more than 9 with respect to the low-molecular weight region (L), the anti-offset properties can be improved, but the low-temperature fixing performance may be deteriorated, thus such a ratio is not preferable. If the high-molecular weight region (H) is less than 0.5 with respect to the low-molecular weight region (L) which is 9.5, there is a possibility of an improvement in the low-temperature fixing performance, but both of the anti-blocking properties and the anti-offset properties may be damaged. Thus, such a ratio is not preferable.

The aromatic vinyl/acrylate or methacrylate copolymer produced using the polymerization initiator according to the present invention may have a weight average molecular weight (Mw) from 5,000 to 2,000,000, a number average molecular weight (Mn) from 2,000 to 1,000,000 and a value of Mw/Mn of not more than 100, preferably Mw from 10,000 to 1,200,000, Mn from 5,000 to 700,000 and Mw/Mn of not more than 70, and more preferably Mw of from 15,000 to 700,000, Mn of from 7,000 to 500,000 and Mw/Mn of from 1.5 to 40.

If the polymer has Mw less than 5,000 or Mn less than 2,000, it is difficult to achieve the rheological characteristics of the toner of the present invention. If the polymer has Mw more than 2,000,000 or Mn more than 1,000,000, it is difficult to satisfy the good fixing performance for various kinds of papers at which the present invention aims. If it has Mw/Mn more than 100, the toner may have poor anti-blocking properties.

The polymer produced using the polymerization initiator according to the present invention can be produced by any production processes including solution polymerization, bulk polymerization, suspension polymerization and emulsion polymerization. It is preferable to produce the polymer by solution polymerization or suspension polymerization.

The aromatic vinyl monomer used in the block copolymer according to the present invention may include styrene, o-methylstyrene, m-methylstyrene, p-methylstyrene, p-methoxystyrene, p-phenylstyrene, p-chlorostyrene, 3,4-dichlorostyrene, p-ethylstyrenee, 2,4-dimethylstyrene, p-n-butylstyrene, p-tert-butylstyrene, p-n-hexylstyelene, p-n-octylstyrene, p-n-nonylstyrene, p-n-decylstyrene and p-n-dodecylstyrene, and preferably styrene, o-methylstyrene, m-methylstyrene and p-methylstyrene.

The acrylate or methacrylate monomer may include α-methylene aliphatic monocarboxylates such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate 2-hydroxyethyl acrylate and 2-hydroxyethyl methacrylate; and preferably butyl acrylate and 2-ethylhexyl acrylate.

In the present invention, the aromatic vinyl/acrylate or methacrylate block copolymer may contain units comprised of other monomers in each unit described in the above four forms (i) to (iv).

These other monomers may include ethylenically unsaturated monoolefins such as ethylene, propylene, butylene and isobutylene; unsaturated polyenes such as butadiene; vinyl halides such as vinyl chloride, vinylidene chloride, vinyl bromide and vinyl fluoride; vinyl esters such as vinyl acetate, vinyl propionate and vinyl benzoate; vinyl ethers such as methyl vinyl ether, ethyl vinyl ether and isobutyl vinyl ether; vinyl ketones such as methyl vinyl ketone, hexyl vinyl ketone and methyl isopropenyl ketone; N-vinyl compounds such as N-vinylpyrrole, N-vinylcarbazole, N-vinylindole and N-vinylpyrrolidone; vinylnaphthalenes; acrylic acid or methacrylic acid derivatives such as acrylonitrile, methacrylonitrile and acrylamide; and esters of α,β-unsaturated acids, and diesters of dibasic acids, as described below.

They may furtherinclude monomers having a carboxyl groups, e.g., unsaturated dibasic acids such as maleic acid, citraconic acid, itaconic acid, alkenylsuccinic acids and methaconic acid; unsaturated dibasic acid anhydrides such as maleic anhydride, citraconic anhydride, itaconic anhydride and alkenylsuccinic anhydrides; half esters of unsaturated dibasic acids such as methyl maleate half ester, ethyl maleate half ester, butyl maleate half ester, methyl citraconate half ester, ethyl citraconate half ester, butyl citraconate half ester, methyl itaconate half ester, methyl alkenylsuccinate half esters, methyl fumarate half ester and methyl methaconate half ester; unsaturated dibasic acid esters such as dimethyl maleate and dimethyl fumarate; α,β-unsaturated acids such as acrylic acid, methacrylic acid, crotonic acid and cinnamic acid; α,β-unsaturated acid anhydrides such as crotonic anhydride and cinnamic anhydride; anhydrides of α,β-unsaturated acids with lower fatty acids; alkenylmalonic acids, alkenylglutaric acids, alkenyladipic acids, and anhydrides and monoesters of these.

Any of these other monomers may preferably be contained in an amount not more than 25%, more preferably not more than 18%, and still more preferably not more than 12%, based on the total monomer units of the block copolymer. This is preferable because the low-temperature fixing performance and the anti-offset properties or the low-temperature fixing performance and the anti-blocking properties can be achieved at the same time and there is substantially no possibility of deteriorating the developing performance of the toner.

The wax contained in the toner may include aliphatic hydrocarbon waxes such as low-molecular weight polyethylene, low-molecular weight polypropylene, microcrystalline wax and paraffin wax; oxides of aliphatic hydrocarbon waxes such as polyethylene wax oxide; block copolymers of aliphatic hydrocarbon waxes; waxes mainly composed of fatty acid esters such as carnauba wax, sazol wax and montanic acid ester wax; and those obtained by deacidifying partially or entirely fatty acid esters, such as deacidified carnauba wax. It may also include saturated straight-chain fatty acids such as palmitic acid, stearic acid, montanic acid and long-chain alkylcarboxylic acids having a long-chain alkyl group; unsaturated fatty acids such as brassylic acid, eleostearic acid and parinaric acid; saturated alcohols such as stearyl alcohol, aralkyl alcohol, behenyl alcohols, carnaubyl alcohol, ceryl alcohol, melissyl alcohol, and long-chain alkyl alcohols having a long-chain alkyl group; polyhydric alcohols such as sorbitol; fatty acid amides such as linolic acid amide, oleic acid amide and lauric acid amide; saturated fatty acid bisamides such as methylenebis(stearic acid amide), ethylene-bis(capric acid amide), ethylene-bis (lauric acid amide) and hexamethylene-bis(stearic acid amide); unsaturated fatty acid amides such as ethylene-bis(oleic acid amide), hexamethylene-bis(oleic acid amide), N,N'dioleyladipic acid amide and N,N'dioleylsebacic acid amide; aromatic bisamides such as m-xylene-bis(stearic acid amide) and N,N'distearylisophthalic acid amide; fatty acid metal salts (commonly what is called metal soap) such as calcium stearate, calcium laurate, zinc stearate and magnesium stearate; waxes obtained by graft-polymerizing vinyl monomers such as styrene or acrylic acid with aliphatic hydrocarbon waxes; partially esterified products of polyhydric alcohols with fatty acids, such as monoglyceride behenate; and methyl esterified compounds having a hydroxyl group, obtained by hydrogenation of vegetable fats and oils.

In the present invention, the toner may preferably have an endothermic main peak in a temperature region from 65° C. to 160° C., more preferably from 70° C. to 160° C., and still more preferably from 72° C. to 155° C., in the DSC curve as measured using a differential scanning calorimeter. This is preferable in view of the low-temperature fixing performance and anti-offset properties of the toner.

More preferably, the toner may have an endothermic main peak and an endothermic sub-peak or endothermic shoulder in a temperature region of from 72° C. to 155° C. in the DSC curve as measured using a differential scanning calorimeter. This is preferable in view of the low-temperature fixing performance, anti-offset properties and anti-blocking properties of the toner.

If the toner has an endothermic main peak in a temperature region lower than 65° C. in the DSC curve, the toner may have an excessively low storage elastic modulus in the vicinity of its glass transition temperature, deteriorating the anti-blocking properties of the toner. If higher than 160° C., the binder resin contained in the toner may be inhibited from smoothly changing in its phase from a glassy state to a molten state, deteriorating the low-temperature fixing performance of the toner.

In order to form a clear endothermic peak in the temperature region from 65 to 160° C. in the DSC curvr of the toner, the wax to be used is limited. When, in the DSC curve in a temperature region of from 30 to 200° C. as measured by a differential scanning calorimeter as will be detailed below, the temperature corresponding to the maximum endothermic peak is defined to be a melting point of wax, the wax having a melting point of from 65 to 160° C. is preferably used. The wax may preferably be functionally separated to improve the low-temperature fixing performance and high-temperature anti-offset properties of the toner. Accordingly, the wax may preferably be composed of at least two types, a low-melting wax component having a relatively low melting point and a high-melting wax component having a relatively high melting point. More specifically, the low-melting wax component may preferably be a wax having a melting point from 65 to 119° C., and more preferably a melting point from 70 to 115° C. The high-melting wax component may preferably be a wax having a melting point from 120 to 160° C., more preferably a melting point from 125 to 155° C., and still more preferably a melting point of from 130 to 150° C.

If the low-melting wax component has a melting point lower than 65° C., the toner may have an excessively low storage elastic modulus in the vicinity of its glass transition temperature, deteriorating the anti-blocking properties of the toner. If the high-melting wax component has a melting point higher than 160° C., the binder resin contained in the toner may be inhibited from smoothly changing in its phase from the glassy state to the molten state, deteriorating the low-temperature fixing performance of the toner.

When using the low-melting wax component and the high-melting wax component in combination, the stated endothermic main peak and endothermic sub-peak or shoulder can be desirably formed in the DSC curve of the toner.

More preferably, the wax is constituted of the low-melting wax component and the high-melting wax component and the low-melting wax component and high-melting wax component may fulfill the following conditions:

$$80 \leq (T_{ML}+T_{MH})/2 \leq 110$$

$$T_{MH}-T_{ML} \geq 20$$

wherein $T_{ML}$ represents a melting point of the low-melting wax component and $T_{MH}$ represents a melting point of the high-melting wax component.

It is further preferable that the difference between the melting point $T_{ML}$ of the low-melting wax component and the melting point $T_{MH}$ of the high-melting wax component is from 30° C. to 90° C.

In the wax used in the toner of the present invention, the low-melting wax component and the high-melting wax component may preferably be used in a ratio ranging from 1/19 to 9/1, more preferably from 1/14 to 4/1, and more preferably from 1/9 to 2/1, by weight. When the above mixing proportion is satisfied, the low-melting wax component and the high-melting wax component can contribute to a more improvement in the low-temperature fixing performance, anti-blocking properties and anti-offset properties of the toner.

In addition to the low-melting wax component and high-melting wax component, at least one additional third wax component may be incorporated so long as the effect of the present invention is not impaired, in order to delicately control the low-temperature fixing performance, anti-blocking properties and anti-offset properties of the toner. The additional wax component may preferably be contained in an amount not more than 20% by weight based on the total weight of the wax, and have a melting point from 60° C. to 150° C.

In the toner of the present invention, the wax may preferably be incorporated in an amount of from 1 to 20 parts by weight, more preferably from 2 to 17 parts by weight, and still more preferably from 3 to 15 parts by weight based on 100 parts by weight of the binder resin. The incorporation of the wax in the above content makes it possible to improve the low-temperature fixing performance, anti-blocking properties and anti-offset properties of the toner, and also decrease the quantity of wax particles liberating from toner particles.

In the present invention, preferred as the low-melting wax components is the use of hydrocarbon wax having a less-branched long-chain alkyl group. Specifically, it may include low-molecular-weight alkylene polymer wax obtained by radical polymerization of alkylenes under a high pressure or by polymerization thereof under a low pressure in the presence of a Ziegler catalyst; alkylene polymer wax obtained by thermal decomposition of high-molecular weight alkylene polymers; and synthetic hydrocarbon wax obtained from, or by hydrogenating, distillation residues of polymethylene hydrocarbons prepared by the Arge process from a synthetic gas containing carbon monoxide and hydrogen. Those obtained through fractionation of hydrocarbon wax by a fractional crystallization system utilizing press-sweating, solvent dewaxing or vacuum distillation are more preferably used. Hydrocarbon, serving as a matrix, may include polymethylene wax synthesized by reacting carbon monoxide with hydrogen in the presence of a metal oxide type catalyst (usually formed of two or more kinds of catalysts). It may further include, e.g., wax obtained by the Synthol method, the Hydrocol process (making use of a fluidized catalyst bed) or the Arge process (making use of a fixed catalyst bed) which provides waxy hydrocarbons in a large quantity.

The long-chain alkyl group may be substituted, at a part of its terminal, with a hydroxyl group and a functional group derived from a hydroxyl group (e.g., a carboxyl group, an ester group, an ethoxy group or a sulfonyl group). The long-chain alkyl group can be obtained by, e.g., the following production process. Ethylene is polymerized in the presence of a Ziegler catalyst and, after the polymerization is completed, the polymer is oxidized to form an alkoxide made from catalyst metal and polyethylene, followed by hydrolysis to produce a long-chain alkyl alcohol. The long-chain alkyl alcohol thus obtained has less and smaller branches, and also has a sharp molecular weight distribution.

Preferred as the high-melting wax components is the use of hydrocarbon wax having a less-branched long-chain alkyl group, or an ethylene-propylene copolymer. Specifically, it may include low-molecular-weight alkylene polymer wax obtained by radical polymerization of alkylenes under a high pressure or by polymerization thereof under a low pressure in the presence of a Ziegler catalyst; alkylene polymer wax obtained by thermal decomposition of high-molecular weight alkylene polymers; and synthetic hydrocarbon wax obtained from, or by hydrogenating, distillation residues of polymethylene hydrocarbons prepared by the Arge process from a synthetic gas containing carbon monoxide and hydrogen.

The long-chain alkyl group may be substituted, at a part of its terminal, with a hydroxyl group and a functional group derived from a hydroxyl group (e.g., a carboxyl group, an ester group, an ethoxy group or a sulfonyl group), or may form a copolymer with styrene, acrylic or methacrylic acid or ester, maleic anhydride or the like.

The low-melting wax component used in the present invention may preferably have a weight average molecular weight from 300 to 2,000, and more preferably from 350 to 1,800. The low-melting wax component may have Mw/Mn not more than 2.8, and preferably not more than 2.3. The high-melting wax component may have a weight average molecular weight from 1,000 to 20,000, preferably from 1,500 to 20,000, and more preferably from 2,000 to 18,000. The high-melting wax component may have Mw/Mn not more than 20, and preferably not more than 15. The wax fulfilling these conditions enables more improvement in the low-temperature fixing performance, anti-blocking properties and anti-offset properties of the toner containing the polymer according to the present invention as the binder resin.

As the combination of the low-melting wax component and high-melting wax component preferably used in the present invention, following combinations may be exemplified.

(1) Combination of low-melting hydrocarbon wax component with high-melting wax component:

The low-melting hydrocarbon wax component may preferably be one having a less-branched long-chain alkyl group, a melting point from 70 to 90° C., a weight average molecular weight from 400 to 1,500 and Mw/Mn from 1.5 to 2.

The high-melting wax component may preferably be the hydrocarbon wax having a less-branched long-chain alkyl group or the ethylene-propylene copolymer, and having a melting point from 120 to 160° C., a weight average molecular weight from 1,500 to 20,000 and Mw/Mn from 2 to 15.

(2) Combination of low-melting hydrocarbon wax component with high-melting substituted alkyl wax component:

As the low-melting wax component, the same low-melting hydrocarbon wax component as in the above (1) may be used.

The high-melting substituted alkyl wax component may preferably be one having the less-branched long-chain alkyl group and having a substituent other than a hydrogen atom at some part in the molecule, where the substituent is a hydroxyl group and/or a carboxyl group and the alkyl component having the substituent is contained in an amount not less than 50% by weight of the whole wax. The high-melting substituted alkyl wax component may preferably be one having a melting point from 120 to 150° C., a weight average molecular weight from 1,000 to 10,000 and Mw/Mn from 1.5 to 2.5.

(3) Combination of low-melting substituted alkyl wax component with high-melting wax component:

The low-melting substituted alkyl wax component may preferably be one having the less-branched long-chain alkyl group and having a substituent other than a hydrogen atom at some part in the molecule, where the substituent is a hydroxyl group and/or a carboxyl group and the alkyl component having the substituent is contained in an amount not less than 40% by weight of the whole wax. The low-melting substituted alkyl wax component may also preferably be one having a melting point from 80 to 115° C., a weight average molecular weight from 400 to 15,000 and Mw/Mn from 1.5 to 2.5.

As the high-melting wax component, the same high-melting wax component as in the above (1) may be used.

(4) Combination of low-melting substituted alkyl wax component with high-melting substituted alkyl wax component:

As the low-melting substituted alkyl wax component, the same low-melting alkyl wax component as in the above (3) may be used.

As the high-melting substituted alkyl wax component, the same high-melting alkyl wax component as in the above (3) may be used.

In the toner of the present invention, in order to allow the toner to exhibit the stated Theological characteristics in a good efficiency, how the binder resin and the wax are selected and combined is important, and also how properly the binder resin and the wax are mixed is important. This is because, even if the binder resin and the wax are properly selected, the original good Theological characteristics can not be exhibited when they are mixed in an improper way.

Methods of mixing the binder resin and the wax, preferably used in the toner of the present invention, will be described below.

In the toner of the present invention, in order to allow the toner to exhibit its viscoelastic characteristics, a low elastic modulus binder resin component, a high elastic modulus binder resin component, the high-melting wax component and the low-melting wax component should be used in combination, which may be mixed by various methods.

Usually, pulverized individual wax components, the binder resin and a colorant (magnetic material) are mixed with stirring by means of a mixing machine such as a Henschel mixer and thereafter the mixture obtained is melt-kneaded. The low-melting component and high-melting component of the wax and optionally the third wax component may be previously melted and mixed. As another method for adding the wax, a method may be used in which the binder resin is heated and dissolved in an organic solvent, followed by addition of the wax and then evaporation of the organic solvent to dryness. Still another method may be used in which, without use of the organic solvent, the binder resin is heated and melted and then the wax is added. In the case where the wax is added in the binder resin by any of these methods, the wax may be used as a mixture prepared by previously melting and mixing the low-melting wax component, the high-melting wax component and optionally the third wax component. A further method for adding the wax is a method in which the wax is added in the course of synthesizing the binder resin. In such an instance too, the wax may be used as a mixture whose components have been adjusted by previously melting and mixing them. Other methods for adding the wax are methods in which only the low-melting wax component is previously added in the binder resin. Specifically, they are a method in which only the binder resin is heated and melted followed by addition of the low-melting wax component, a method in which the binder resin is heated and dissolved in an organic solvent, followed by addition of the wax and then evaporation of the organic solvent to dryness, and a method in which the low-melting wax component is added in the course of synthesizing the binder resin. In such instances, the high-melting wax component is mixed with the binder resin containing the low-melting wax component, and a colorant (magnetic material) with stirring by means of a mixing machine such as a Henschel mixer and thereafter the mixture obtained is melt-kneaded.

In the toner for developing an electrostatic image according to the present invention, a charge control agent may be optionally used in order to make its charging performance stabler. The charge control agent may preferably be used in an amount from 0.1 to 10 parts by weight, and more preferably from 0.1 to 5 parts by weight based on 100 parts by weight of the binder resin.

The charge control agent may include the following.

For example, it may include organic metal complexes, chelate compounds and organic metal salts. Specifically, it may include monoazo metal complexes; and metal salts of aromatic hydroxycarboxylic acids or aromatic dicarboxylic acids. In addition, it may include aromatic hydroxycarboxylic acids, aromatic mono- or polycarboxylic acids, anhydrides thereof, esters thereof; and phenol derivatives such as bisphenol.

When the toner of the present invention is used as a magnetic toner, the magnetic toner contains a magnetic material which may include iron oxides such as magnetite, hematite and ferrite; metals such as Fe, Co and Ni, or alloys of any of these metals with any of metals such as Al, Co, Cu, Pb, Mg, Ni, Sn, Zn, Sb, Be, Bi, Cd, Ca, Mn, Se, Ti, W and V, and mixtures of any of these.

Specifically, the magnetic material may include triiron tetraoxide ($Fe_3O_4$), iron sesquioxide ($\gamma$-$Fe_2O_3$), zinc iron oxide ($ZnFe_2O_4$), yttrium iron oxide ($Y_3Fe_5O_{12}$), cadmium iron oxide ($CdFe_2O_4$), gadolinium iron oxide ($Gd_3Fe_5O_{12}$), copper iron oxide ($CuFe_2O_4$), lead iron oxide ($PbFe_{12}O_{19}$), nickel iron oxide ($NiFe_2O_4$), neodymium iron oxide ($NdFe_2O_3$), barium iron oxide ($BaFe_{12}O_{19}$), magnesium iron oxide ($MgFe_2O_4$), manganese iron oxide ($MnFe_2O_4$), lanthanum iron oxide ($LaFeO_3$), iron powder (Fe), cobalt powder (Co), and nickel powder (Ni). Any of the above magnetic materials may be used alone or in a combination of two or more. A particularly preferred magnetic material is fine powder of triiron tetraoxide or $\gamma$-iron sesquioxide.

These magnetic materials may preferably be those having an average particle diameter from 0.1 to 2 $\mu$m, and more preferably from 0.1 to 0.5 $\mu$m, and a coercive force from 20 to 150 oersteds, a saturation magnetization from 50 to 200 emu/g (preferably from 50 to 100 emu/g) and residual magnetization from 2 to 20 emu/g, as magnetic properties under application of a magnetic field of 10 k oersteds.

The magnetic material may be used in an amount from 10 to 200 parts by weight, and preferably from 20 to 150 parts by weight, based on 100 parts by weight of the binder resin.

In addition to the magnetic material, carbon black, titanium white, and other pigments and/or dyes may be used as colorants. For example, when the toner of the present invention is used as a magnetic color toner, the dyes include C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4 and C.I. Basic Green 6. The pigments include mineral first yellow, navel yellow, Naphthol Yellow S, Hanza Yellow G, Permanent Yellow NCG, Tartrazine Lake, molybdenum orange, Permanent Orange GTR, Pyrazolone Orange, Benzidine Orange G, cadmium red, Permanent Red 4R, Watchung Red calcium salt, eosine lake, Brilliant Carmine 3B, manganese violet, Fast Violet B, Methyl Violet Lake, cobalt blue, Alkali Blue Lake, Victoria Blue Lake, Phthalocyanine Blue, Fast Sky Blue, Indanthrene Blue BC, Pigment Green B, Malachite Green Lake, and Final Yellow Green G.

When the toner of the present invention is used as non-magnetic full-color toners for two-component developers or for one-component developers, the colorant may include those as shown below. A magenta coloring pigment may include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, 209, C.I. Pigment Violet 19, and C.I. Vat Red 1, 2, 10, 13, 15, 23, 29, 35.

The pigment may be used alone. From the viewpoint of the image quality of full-color images, it is more preferable to use the pigment and the dye in combination so that the sharpness of images can be improved. A magenta dye may include oil-soluble dyes such as C.I. Solvent Red 1, 3, 8, 23, 24, 25, 27, 30, 49, 81, 82, 83, 84, 100, 109, 121, C.I. Disperse Red 9, C.I. Solvent Violet 8, 13, 14, 21, 27, and C.I. Disperse Violet 1; and basic dyes such as C.I. Basic Red 1, 2, 9, 12, 13, 14, 15, 17, 18, 22, 23, 24, 27, 29, 32, 34, 35, 36, 37, 38, 39, 40, and C.I. Basic Violet 1, 3, 7, 10, 14, 15, 21, 25, 26, 27, 28.

A cyan coloring pigment it may include C.I. Pigment Blue 2, 3, 15, 16, 17; C.I. Vat Blue 6; C.I. Acid Blue 45, or copper phthalocyanine pigments whose phthalocyanine skeleton has been substituted with 1 to 5 phthalimide methyl group (s), having a structure represented by the formula:

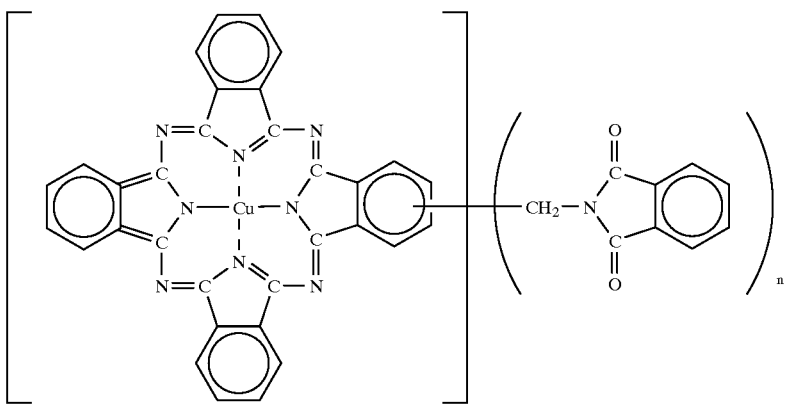

n = 1 to 5

A yellow coloring pigment may include C.I. Pigment Yellow 1, 2, 3, 4, 5, 6, 7, 10, 11, 12, 13, 14, 15, 16, 17, 23, 65, 73, 83, and C.I. Vat Yellow 1, 3, 20.

In the non-magnetic color toner, the colorant may be used in an amount from 0.1 to 60 parts by weight, and preferably from 0.5 to 50 parts by weight, based on 100 parts by weight of the binder resin.

A fluidity-improving agent may be added (in particular, externally added) in the toner of the present invention. The fluidity-improving agent, when added in the toner, brings about an increase in fluidity when making comparison between before and after the addition. For example, it may include fluorine resin powder such as fine vinylidene fluoride powder and fine polytetrafluoroethylene powder; fine silica powder such as wetprocess silica and dryprocess silica, fine titanium oxide powder, fine aluminum oxide powder, and treated silica, treated titanium oxide or treated aluminum oxide, which have been subjected to surface treatment with a silane coupling agent, a titanium coupling agent or silicone oil.

A preferred fluidity-improving agent is fine powder produced by vapor phase oxidation of silicon halide, what is called dry process silica or fumed silica. For example, it is a process that utilizes heat decomposition oxidation reaction in the oxygen and hydrogen flame of silicon tetrachloride gas. The reaction basically proceeds as follows.

$$SiCl_4 + 2H_2 + O_2 \rightarrow SiO_2 + 4HCl$$

In this production step, it is also possible to use other metal halide such as aluminum chloride or titanium chloride together with silicon halide to obtain composite fine powder of silica with other metal oxide, thus the fine silica powder includes these, too. As to its particle diameter, it is preferable to use fine silica powder having an average primary particle diameter within the range from 0.001 to 2 μm, and particularly within the range from 0.002 to 0.2 μm.

Commercially available fine silica powder produced by the vapor phase oxidation of silicon halide, include, for example, those which are on the market under the following trade names.

Aerosil 130, 200, 300, 380, TT600, MOX170, MOX80, COK84 (Aerosil Japan, Ltd.);
Ca-O-SiL M-5, MS-7, MS-75, HS-5, EH-5 (CABOT CO.);
Wacker HDK N20, V15, N20E, T30, T40 (WACKER-CHEMIE GMBH);
D-C Fine Silica (Dow-Corning Corp.); and Fransol (Franeil Co.).

More preferred is the use of the treated fine silica powder obtained by making hydrophobic the fine silica powder produced by vapor phase oxidation of silicon halide. In the treated fine silica powder, a fine silica powder is particularly preferred which has been so treated that its hydrophobicity as measured by methanol titration shows a value within the range from 30 to 80.

The hydrophobicity of the fine silica powder may be imparted by chemical treatment with an organosilicon compound capable of reacting with, or being physically adsorbed by, the fine silica powder. It is preferred that the fine silica powder produced by vapor phase oxidation of a silicon halide is treated with an organosilicon compound.

The organosilicon compound may include hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triornanosilyl mercaptan, tirmethylsilyl mercaptan, tirornanosilyl acrylate, vinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane, and a dimethylpolysiloxane having 2 to 12 siloxane units per molecule and containing a hydroxyl group bonded to each Si in the unit positioned at the end. It may further include silicone oils such as dimethylsilicone oil. Any of these may be used alone or in the form of a mixture of two or more.

As the fluidity-improving agent, a positively chargeable hydrophilic silica may be used which is obtained by treating the above dry-process silica with a silane coupling agent having an amino group or a silicone oil having an amino group, as shown below.

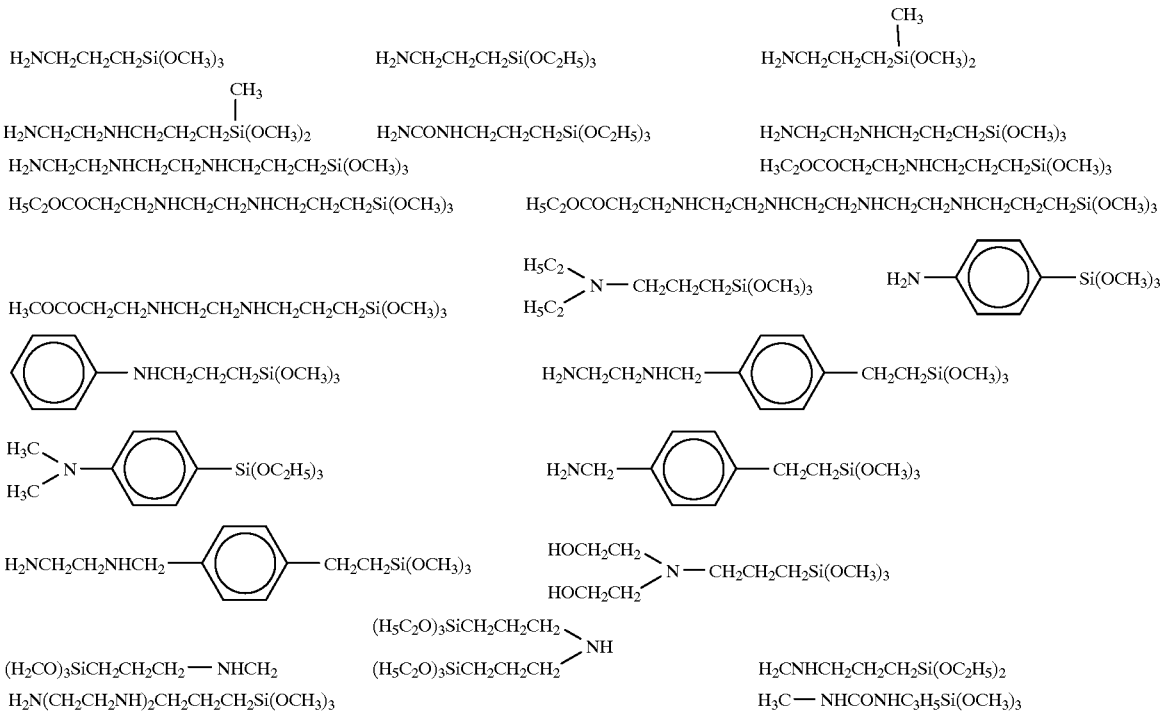

As the silicone oil, an amino-modified silicone oil with a unit structure having an amino group on its side chain, represented by the following formula, is commonly used.

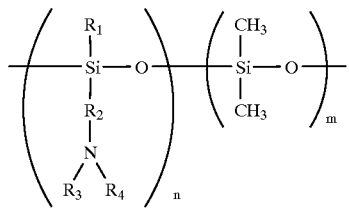

wherein $R_1$ represents a hydrogen atom, an alkyl group, an aryl group or an alkoxyl group; $R_2$ represents an alkylene group or a phenylene group; $R_3$ and $R_4$ each represent a hydrogen atom, an alkyl group or an aryl group. The above alkyl group, aryl group, alkylene group and phenylene group may each contain an amine, and may have a substituent such as a halogen atom so long as the chargeability is not damaged. Letter symbols m and n each represent a positive integer.

Such a silicone oil having an amino group includes, e.g., the following.

| Trade name | Viscosity at 25° C. (cps) | Amine equivalent weight |
|---|---|---|
| SF8417 (*1) | 1,200 | 3,500 |
| KF393 (*2) | 60 | 360 |
| KF857 (*2) | 70 | 830 |
| KF860 (*2) | 250 | 7,600 |
| KF861 (*2) | 3,500 | 2,000 |
| KF862 (*2) | 750 | 1,900 |
| KF864 (*2) | 1,700 | 3,800 |
| KF865 (*2) | 90 | 4,400 |

-continued

| Trade name | Viscosity at 25° C. (cps) | Amine equivalent weight |
|---|---|---|
| KF369 (*2) | 20 | 320 |
| KF383 (*2) | 20 | 320 |
| X-22-3680 (*2) | 90 | 8,800 |
| X-22-380D (*2) | 2,300 | 3,800 |
| X-22-3801C (*2) | 3,500 | 3,800 |
| X-22-3810B (*2) | 1,300 | 1,700 |

*1: available from Toray Silicone Co., Ltd.
*2: available from Shin-Etsu Chemical Co., Ltd.

The amine equivalent weight refers to the equivalent weight per one amine (g/equiv), and is a value obtained by dividing molecular weight by the number of amine per molecule.

As the fluidity-improving agent, those having a specific surface area of 30 $m^2$/g or above, and preferably 50 $m^2$/g or above, as measured by the BET method using nitrogen absorption bring about good results. The fluidity-improving agent may preferably be used in an amount from 0.01 to 8 parts by weight, and preferably from 0.1 to 4 parts by weight, based on 100 parts by weight of the toner.

The toner for developing an electrostatic image according to the present invention can be produced by well mixing the binder resin, the colorant and/or magnetic material, the charge control agent and other additives by means of a mixing machine such as a Henschel mixer or a ball mill, thereafter melt-kneading the mixture by means of a heat kneading machine such as a kneader or an extruder to compatibilize the resins to each other, and then cooling and solidifying the melt-kneaded product, followed by pulverization and classification. Thus the toner of the present invention can be obtained.

The toner of the present invention may preferably have a weight average particle diameter of from 3 to 9 μm, and more preferably from 3 to 8 μm, in view of resolution and image density. Thus, even a toner having a small particle diameter can be fixed well by heat and pressure.

The fluidity-improving agent and the toner are mixed well by means of a mixing machine such as a Henschel mixer, and a toner having the fluidity-improving agent on the toner particle surfaces can be obtained.

The Theological characteristics and other physical properties of the toner of the present invention are measured by the methods as described below.

(1) Measurement of rheological characteristics of toner and binder resin:

Measured using a viscoelasticity measuring device (a rheometer) Model RDA-II (manufactured by Rheometrix Co.).

Measuring jig:

Parallel plates of 7.9 mm in diameter were used when the toner or binder resin has a high modulus of elasticity, and 25 mm in diameter when it has a low modulus of elasticity.

Sample to be measured:

The toner or binder resin is heated and melted, and thereafter molded into a columnar sample of about 8 mm in diameter and 2 to 5 mm in height or a disklike sample of about 25 mm in diameter and 2 to 3 mm in thickness.

Measurement frequency: 6.28 radian/second

Setting of measurement strain:

Its initial value is set at 0.1%, and the measurement is made in an automatic measurement mode.

Correction of elongation of sample:

Adjusted in an automatic measurement mode.

Measurement temperature:

Raised from 25° C. to 150° C. at a rate of 1° C. per minute.

An example of the results of measurement is shown in FIG. 1.

(2) Measurement of melting point of wax:

Measured using a differential scanning calorimeter (DSC measuring device) DSC-7 (manufactured by Perkin-Elmer Corporation) according to ASTM D3418-82.

A sample to be measured is precisely weighed in a quantity of 5 to 10 mg, and preferably 5 mg.

This sample is put in an aluminum pan. Using an empty aluminum pan as a reference, the measurement is made in an environment of normal temperature and normal humidity in a measurement temperature range between 30° C. and 200° C. at a temperature rise rate of 10° C./min. During this temperature rise, an endothermic peak of the main peak in the range of temperatures 30° C. to 200° C. is obtained.

The temperature at which this endothermic main peak appears is regarded as the melting point of the wax.

(3) Measurement of DSC curve of toner:

A DSC curve in the course of temperature rise of toner is measured in the same manner as in the measurement of the melting point of the wax.

(4) Measurement of glass transition temperature (Tg) of binder resin:

Measured using a differential scanning calorimeter (DSC measuring device) DSC-7 (manufactured by Perkin-Elmer Corporation) according to ASTM D3418-82.

A sample to be measured is precisely weighed in a quantity of 5 to 20 mg, and preferably 10 mg.

This sample is put in an aluminum pan. Using an empty aluminum pan as a reference, the measurement is made in an environment of normal temperature and normal humidity at a measuring temperature range between 30° C. and 200° C. at a temperature rise rate of 10° C./min. During this temperature rise, an endothermic peak of the main peak in the range of temperatures 40° C. to 100° C. is obtained.

The point at which the line at a middle point of the base lines before and after appearance of the endothermic peak and the differential thermal curve intersect is regarded as the glass transition point Tg in the present invention.

(5) Measurement of molecular weight distribution of wax:

Gel permeation chromatography measuring apparatus: GPC-150 (Waters Co.)

Columns: GMH-HT 30 cm, two series (available from Toso Co., Ltd.)

Temperature: 135° C.

Solvent: o-Dichlorobenzene (0.1% ionol-added)

Flow rate: 1.0 ml/min

Sample: 0.4 ml of 0.15% sample is injected.

Measured under the conditions described above. Molecular weight of the sample is calculated using a molecular weight calibration curve prepared from a monodisperse polystyrene standard sample. Further, the resulting value is converted into polyethylene according to a conversion formula derived from the Mark-Houwink viscosity formula.

(6) Measurement of molecular weight of polymer, toner binder resin, and toner THF-soluble matter:

Molecular weights in GPC chromatograms are measured under the following conditions.

Columns are stabilized in a heat chamber of 40° C. To the columns kept at this temperature, tetrahydrofuran (THF) as a solvent is flowed at a flow rate of 1 ml per minute. When a sample is a binder resin material, the binder resin material is passed through a roll mill as it is (130° C., 15 minutes), and put into use. Concentration of the sample is adjusted to 0.05 to 0.5% by weight, and 50 to 200 $\mu$l of the resin THF solution obtained is injected to make measurement. In measuring the molecular weight of the sample, the molecular weight distribution of the sample is calculated from the relation between the logarithmic value and count number of a calibration curve prepared using several kinds of monodisperse polystyrene standard samples. As the standard polystyrene samples used for the preparation of the calibration curve, it is suitable to use, e.g., samples with molecular weights of $6\times10^2$, $2.1\times10^3$, $4.1\times10^3$, $1.75\times10^4$, $5.1\times10^4$, $1.1\times10^5$, $3.9\times10^5$, $8.6\times10^5$, $2\times10^6$ and $4.48\times10^6$, which are available from Pressure Chemical Co. or Toso Co., Ltd., and to use at least about 10 standard polystyrene samples. An RI (refractive index) detector is used as a detector.

It is preferred that two or more of commercially available polystyrene gel columns are used in combination so that molecular weight regions of 1,000 to 2,000,000 can be accurately measured. For example, the following are preferable: a combination of p-Styragel 500, $10^3$, $10^4$ and $10^5$, available from Waters Co., or a combination of Shodex KA-801, KA-802, KA-803, KA-804, KA-805, KA-806 and KA-807, available from Showa Denko K.K.

(7) Preparation of THF-soluble matter used in measurement of molecular weight by GPC:

About 25 mg of toner is added to 5 ml of THF, and the mixture obtained is left standing at room temperature for about 10 hours. Insoluble matters such as pigment, external additives, wax and gels are filtered off with a filter of 0.5 $\mu$m in sieve opening (MAISHORI DISK H-25-5, available from Toso Co., Ltd.) to prepare a sample.

(8) Measurement of $^1$H-NMR (nuclear magnetic resonance):

Measuring device: FT NMR device JNM-EX400 (manufactured by Nippon Denshi K.K.)

Measurement frequency: 399.65 MHz

Pulse condition: 5.8 $\mu$s

Data point: 32768

Measurement frequency: 10,500.00 MHz
Integration times: 64
Measurement temperature: 40° C.
Sample: 200 mg of a sample to be measured is put into a sample tube of 5 mm in diameter, and heavy chloroform is added as a solvent, followed by dissolution in a thermostatic chamber at 40° C. to prepare a sample.

The image forming method of the present invention will be described below.

Figure 2:
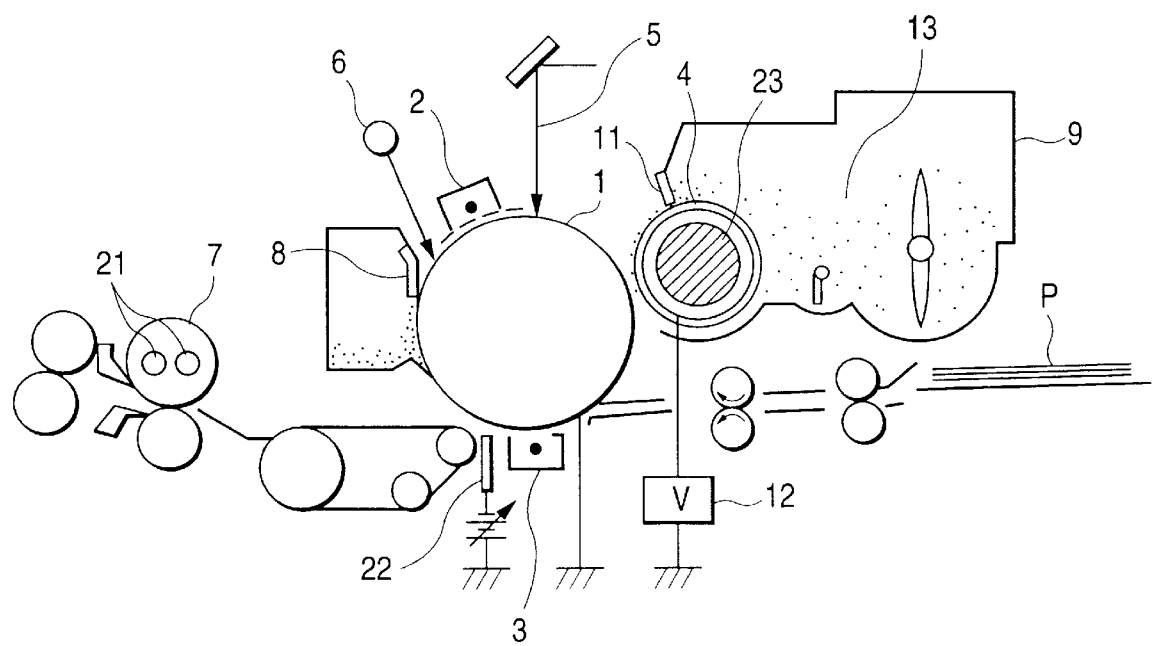
FIG. 2 illustrates an example of an image forming apparatus that can carry out the image forming method of the present invention.
Figure 3:
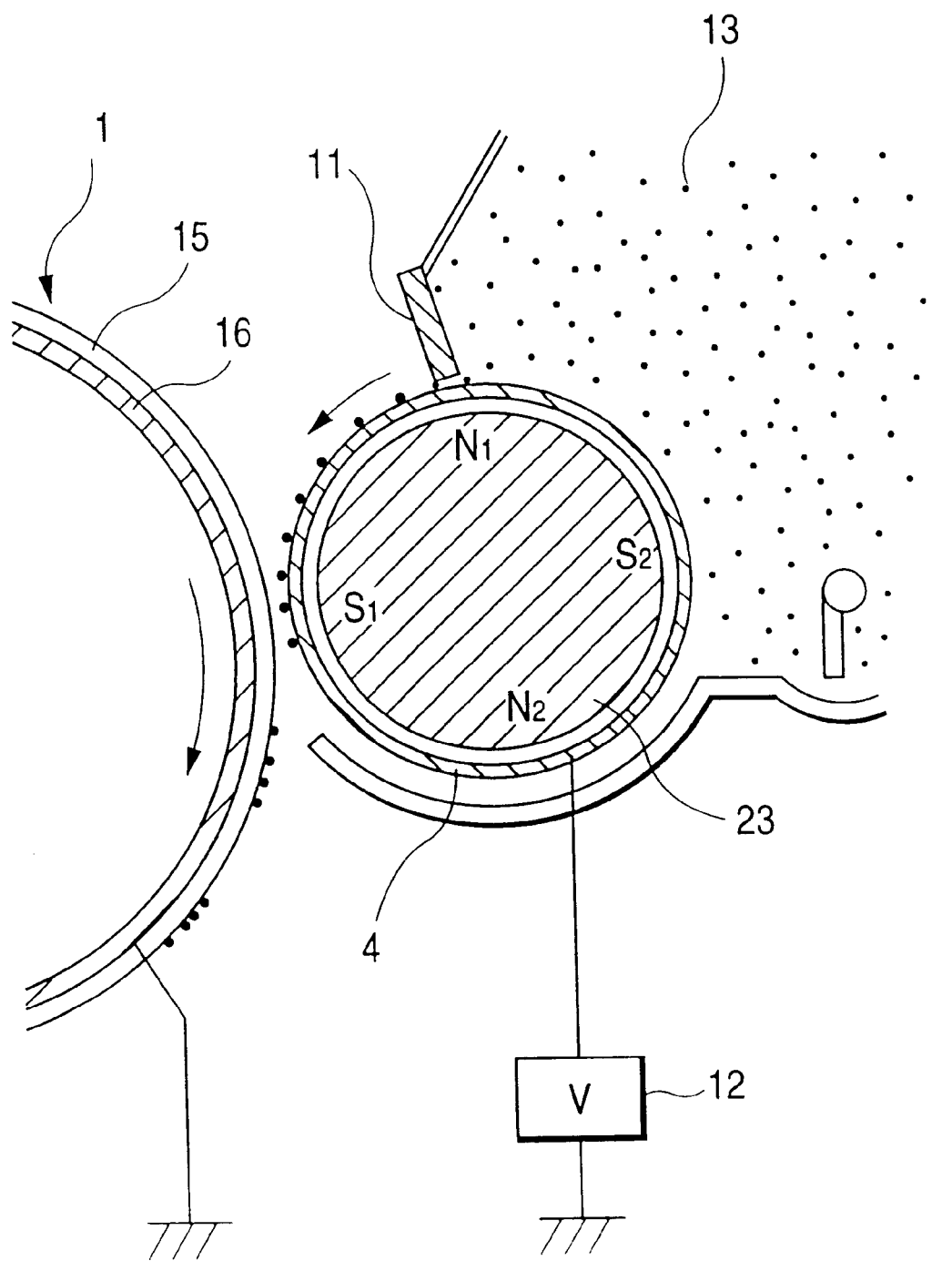
FIG. 3 is an enlarged view of the developing part of the image forming apparatus shown in FIG. 2.

An example of an image forming apparatus that can carry out the image forming method of the present invention will be described with reference to FIGS. 2 and 3. The surface of an electrostatic image bearing member (a photosensitive member) 1 is negatively or positively charged by a primary corona assembly 2, and subjected to analog exposure or laser light exposure 5 to form an electrostatic latent image (e.g.,a digital latent image by image scanning). The latent image thus formed is reverse-developed or regular-developed using a magnetic toner 13 held in a developing assembly 9 equipped with a magnetic blade 11 and a developing sleeve 4 internally provided with a magnet 23 having magnetic poles N1, N2, S1 and S2. In the developing zone, an AC bias, a pulse bias and/or a DC bias is/are applied between a conductive substrate 16 of the photosensitive member 1 and the developing sleeve 4 through a bias applying means 12. A recording medium P is fed and delivered to the transfer zone, where the recording medium P is electrostatically positively or negatively charged by a voltage applying means 8 from its back surface (the surface opposite to the photosensitive member) through a transfer charging assembly 3, so that the negatively charged toner image or positively charged toner image on the surface of the photosensitive member is electrostatically transferred to the recording medium P. After removing charges by a charge elimination means 22, the recording medium P separated from the photosensitive member 1 is subjected to fixing using a heat-pressure roller fixing assembly 7 internally provided with a heater 21, so that the toner image on the recording medium P is fixed by heat and pressure.

The magnetic toner remaining on the photosensitive member 1 after the transfer step is removed by the operation of a cleaning means 8 having a cleaning blade 8. After the cleaning, the residual charges on the surface of the photosensitive member 1 are eliminated by erase exposure 6, and the procedure again starting from the charging step using the primary corona assembly 2 is repeated.

The electrostatic latent image bearing member (e.g., a photosensitive drum) 1 comprises a photosensitive layer 15 and a conductive substrate 16, and is rotated in the direction of an arrow. In the developing zone, a developing sleeve 4 formed of a non-magnetic cylinder, which serves as a toner carrying member, is rotated so as to move in the same direction as the direction in which the photosensitive member 11 is rotated. Inside the non-magnetic cylindrical developing sleeve 4, a multi-polar permanent magnet (a magnet roll) 23 serving as a magnetic field generating means is provided in an unrotatable state. The magnetic toner 13 held in the developing assembly 9 is coated on the surface of the developing sleeve 4, and triboelectric charges are imparted to the magnetic toner particles due to friction between the surface of the developing sleeve 4 and the magnetic toner particles. A magnetic doctor blade 11 made of iron is also provided in close proximity to the surface of the cylindrical developing sleeve 4 (distance: 50 $\mu$m to 500 $\mu$m) opposite to the position of one magnetic pole of the multi-polar permanent magnet and thereby the thickness of magnetic toner layer is controlled to be thin (30 $\mu$m to 300 $\mu$m) and uniform so that a magnetic toner layer is formed in a thickness equal to or smaller than the gap between the photosensitive member 1 and the developing sleeve 4 in the developing zone. The rotational speed of this developing sleeve 4 is regulated so that the peripheral speed of the developing sleeve can be substantially equal or close to the peripheral speed of the photosensitive member 1. As the magnetic doctor blade 17, a permanent magnet in place of iron may be used to form an oppose magnetic pole. In the developing zone, an AC bias or a pulse bias may be applied to the developing sleeve 4 through the bias means 12. This AC bias may have a frequency (f) of 200 to 4,000 Hz and a Vpp of 500 to 3,000 V. The magnetic toner particles move to the side of the electrostatic latent image by the electrostatic force on the surface of the photosensitive member and the action of the AC bias or pulse bias.

In place of the magnetic blade 11, an elastic doctor blade made of an elastic material such as silicone rubber may be used the layer thickness of the magnetic toner layer by pressing, applying to coat the magnetic toner on the developing sleeve.

Figure 5:
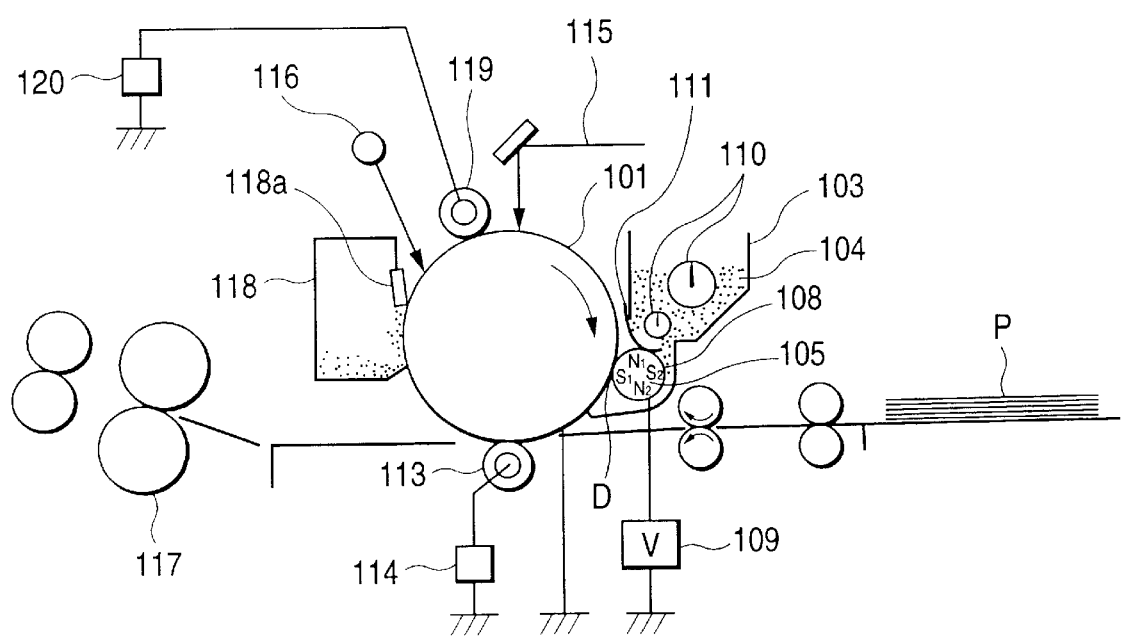
FIG. 5 illustrates another example of an image forming apparatus that can carry out the image forming method of the present invention.

FIG. 5 shows another example of an image forming apparatus which can carry out the image forming method of the present invention.

The surface of a photosensitive drum 101 as the electrostatic latent image bearing member is negatively charged by a contact (roller) charging means 119 serving as a primary charging means, and exposed to laser light 115 to form a digital latent image on the photosensitive drum 101 by image scanning. The digital latent image thus formed is reverse-developed using a magnetic toner 104 held in a hopper 103 and by means of a developing assembly having an elastic control blade 111 as a toner layer thickness control member and equipped with a developing sleeve 108 serving as a toner carrying member and internally provided with a multi-polar permanent magnet 105. As shown in FIG. 5, in the developing zone D, a conductive substrate of the photosensitive drum is earthed and an AC bias, a pulse bias and/or a DC bias is/are applied to the developing sleeve 108 through a bias applying means 109. A recording medium P is fed and delivered to the transfer zone, where the recording medium P is electrostatically charged by a voltage applying means 114 from its back surface (the surface opposite to the photosensitive drum) through a contact (roller) transfer means 113, so that the toner image formed on the surface of the photosensitive drum 101 is transferred to the recording medium P by a contact transfer means 113. The recording medium P separated from the photosensitive drum 101 is delivered to a heat-pressure roller fixing assembly 117 serving as a fixing means, so that the toner image on the recording medium P is fixed by the fixing assembly 117.

The magnetic toner 104 remaining on the photosensitive drum 101 after the transfer step is removed by the operation of a cleaning means 118 having a cleaning blade 118a. When the remaining magnetic toner 104 is in a small quantity, the step of cleaning may be omitted. After the cleaning, the residual charges on the surface of the photosensitive drum 101 is optionally eliminated by erase exposure 116, and the procedure again starting from the charging step using the contact (roller) charging means 119 serving as the primary charging assembly is repeated.

In a series of steps as described above, the photosensitive drum (i.e., the electrostatic latent image bearing member) 101 comprises a photosensitive layer and a conductive substrate, and is rotated in the direction of an arrow. In the developing zone D, a developing sleeve 108 formed of a non-magnetic cylinder, which is a toner carrying member, is rotated so as to move in the same direction as the direction in which the photosensitive drum 11 is rotated. Inside the developing sleeve 108, a multi-polar permanent magnet 108 (magnet roll) 105 serving as a magnetic field generating means is provided in an unrotatable state. The magnetic toner 104 held in the developing assembly 103 is applied coated and carried on the developing sleeve 108, and for example, negative triboelectric charges are imparted to the magnetic toner due to friction between the surface of the developing sleeve 108 and the magnetic toner particles and/or between magnetic toner particles themselves. The elastic control blade 111 is also provided so as to elastically press the surface of the developing sleeve 108. Thus, the thickness of the toner layer is controlled to be thin (30 μm to 300 μm) and uniform so that a magnetic toner layer thinner than the gap between the photosensitive drum 101 and the developing sleeve 108 in the developing zone D is formed. The rotational speed of the developing sleeve 108 is regulated so that the peripheral speed of the developing sleeve 108 can be substantially equal or close to the peripheral speed of the photosensitive drum 101. In the developing zone D, an AC bias or a pulse bias may be applied to the developing sleeve 108 through a bias applying means 109. This AC bias may have a frequency (f) of from 200 to 4,000 Hz and a Vpp of from 500 to 3,000 V.

The magnetic toner moves to the side of the electrostatic latent image by the electrostatic force of the surface of the photosensitive drum and the action of the AC bias or pulse bias.

Figure 6:
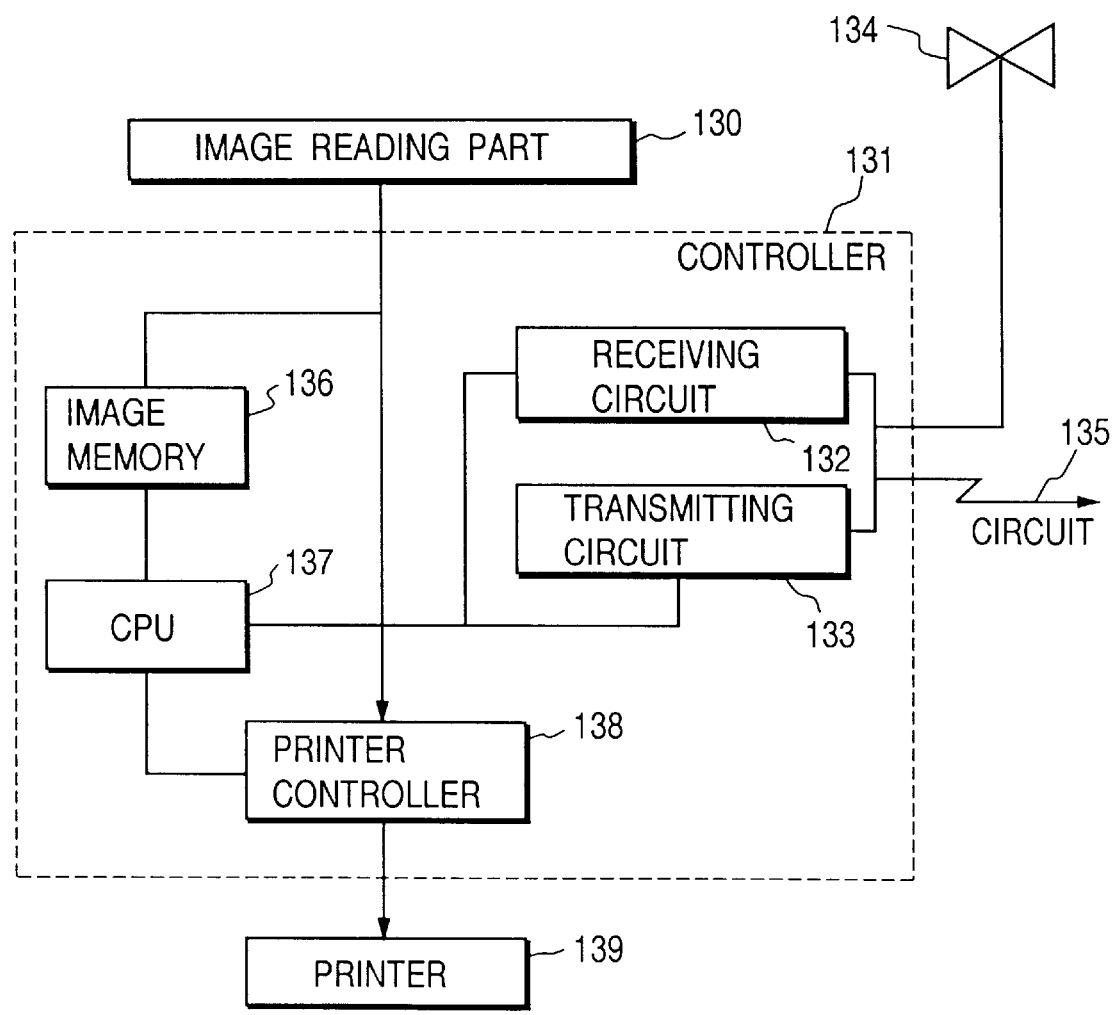
FIG. 6 is a block diagram in which the image forming apparatus employing the image forming method of the present invention is used in a printer of a facsimile machine.

In the case when the above image forming apparatus of the present invention is used as a printer of a facsimile machine, optical image exposure L serves as exposure for printing received data. FIG. 6 illustrates an example of such case in the form of a block diagram.

A controller 131 controls an image reading part 130 and a printer 139. The whole of the controller 131 is controlled by a CPU 137. Image data outputted from the image reading part is sent to the other facsimile station through a transmitting circuit 133. Data received from the other station is sent to a printer 139 through a receiving circuit 132. Given image data are stored in an image memory 136. A printer controller 138 controls the printer 139. Reference numeral 134 denotes a telephone.

An image received from a circuit 135 (image information from a remote terminal connected through the circuit) is demodulated in the receiving circuit 132, and then successively stored in an image memory 136 after the image information is decoded by the CPU 137. Then, after images for at least one page have been stored in the memory 136, the image recording for that page is carried out. The CPU 137 reads out the image information for one page from the memory 136 and sends the coded image information for one page to the printer controller 138. The printer controller 138, having received the image information for one page from the CPU 137, controls the printer 139 so that the image information for one page is recorded.

The CPU 137 receives image information for next page in the course of the recording by the printer 139.

In this way, the images are received and recorded.

The toner for developing an electrostatic image according to the present invention is superior in low-temperature fixing performance, anti-offset properties, anti-blocking properties and many-sheet running performance even when used for a transfer-receiving paper having a large thickness.

EXAMPLES

The present invention will be further described below by giving Examples.

Production of polymer of the present invention:

Production Example 1

In a reaction vessel having a reflux pipe, a stirrer, a thermometer, a nitrogen gas feed pipe and a dropping device, 200 parts by weight of purified xylene was placed and thereafter the reaction vessel was heated to 100° C. while introducing nitrogen. In the first stage of polymerization (first-stage polymerization reaction), a first monomer composition comprised of 78 parts by weight of styrene monomer, 2.3 parts by weight of the exemplary compound (2-5) as a radical polymerization initiator and 100 parts by weight of xylene was dropped over 2 hours, and maintained at that temperature for 8 hours. In the second stage of polymerization reaction (second-stage polymerization reaction), the reaction vessel was heated to 120° C., and a second monomer composition comprised of 22 parts by weight of butyl acrylate monomer and 50 parts by weight of xylene was dropped over 1 hour, which was maintained at that temperature for 8 hours. The polymerization reaction was completed to produce a xylene solution of polymer (1).

From the xylene solution of polymer (1) thus obtained, xylene was distilled off under reduced pressure to produce a solid matter of the polymer (1). The polymer (1) thus obtained had Mw: 18,900, Mn: 9,800, Mw/Mn: 1.9 and Tg: 61.8° C.

Figure 7:
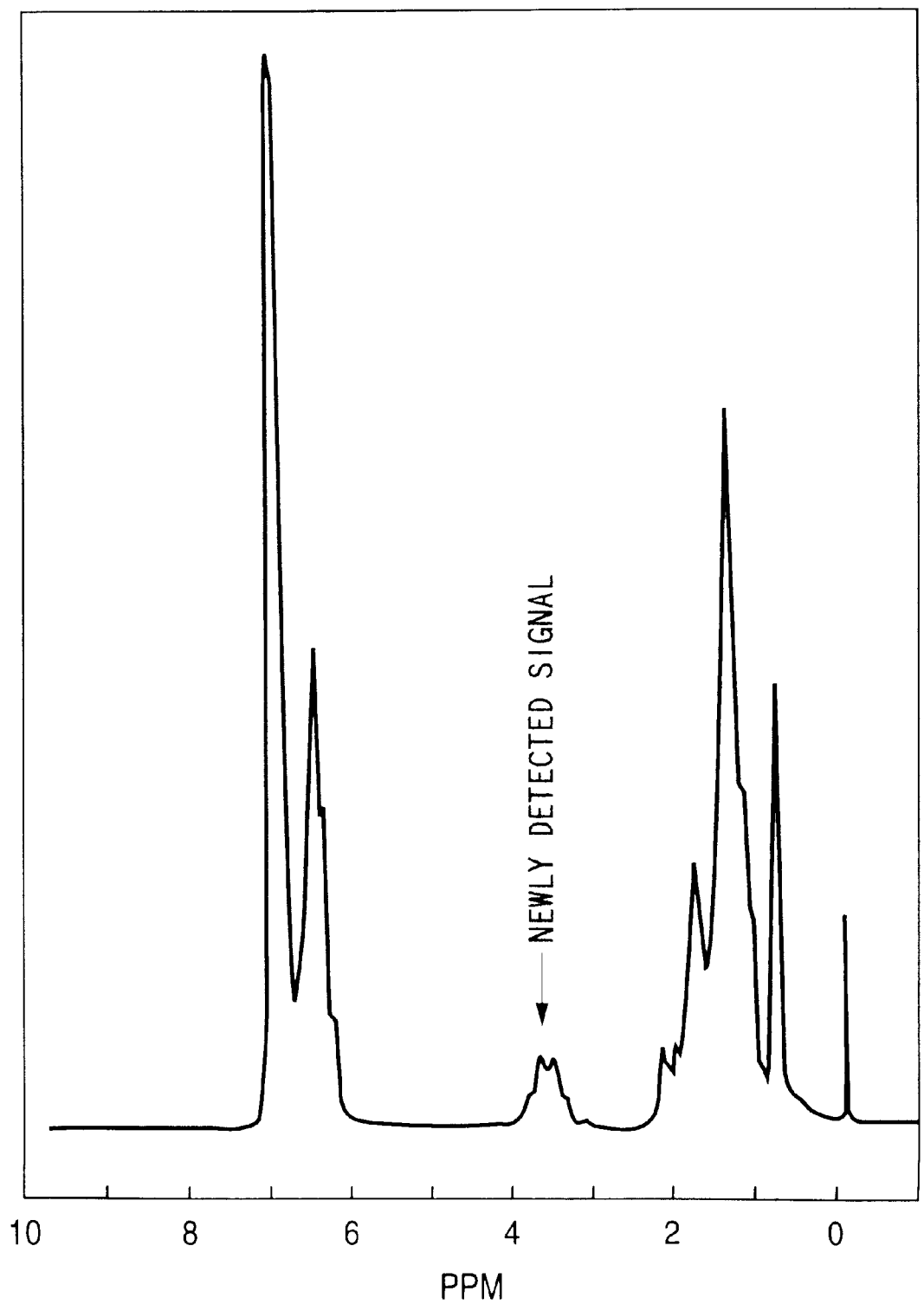
FIG. 7 is a chart showing a $^1$H-NMR spectrum of polymer (1) produced in Production Example 1.

The $^1$H NMR spectrum of the polymer (1) obtained was measured, obtaining the results as shown in FIG. 7. This was compared with the $^1$HNMR spectrum of polymer (20) shown in FIG. 8, the polymer (20) being composed of the random copolymer produced in Comparative Production Example 1. It was found that a random copolymer is partly formed in the polymer (1), and a new signal presumed to be ascribable to a block copolymer constituted of only a butyl acrylate monomer unit was detected around 3.8 ppm.

Production Example 2

Polymer (2) was obtained in the same manner as in Production Example 1 except that in the first-stage polymerization reaction 70 parts by weight of styrene monomer and 8 parts by weight of monobutyl maleate monomer were substituted for the monomers of the first monomer composition, and in the second-stage polymerization reaction 22 parts by weight of butyl acrylate monomer was substituted for the monomers of the second monomer composition.

The polymer (2) thus obtained had Mw: 19,900, Mn: 8,100, Mw/Mn: 2.5 and Tg: 62.4° C.

Production Example 3

Polymer (3) was obtained in the same manner as in Production Example 1 except that in the first-stage polymerization reaction a first monomer composition comprised of 22 parts by weight of butyl acrylate monomer, 2.3 parts by weight of the exemplary compound (2-5) and 80 parts by weight of xylene was used and in the second-stage polymerization reaction a second monomer composition comprised of 78 parts by weight of styrene monomer and 50 parts by weight of xylene was used.

The polymer (3) thus obtained had Mw: 29,100, Mn: 12,400, Mw/Mn: 2.4 and Tg: 62.8° C.

Production Example 4

Polymer (4) was obtained in the same manner as in Production Example 1 except that the first-stage polymerization reaction was carried out at 90° C. for 7 hours using the exemplary compound (3-4) as the radical polymerization initiator and the second-stage polymerization reaction was carried out at 115° C. for 8 hours.

The polymer (4) thus obtained had Mw: 24,500, Mn: 12,300, Mw/Mn: 2.0 and Tg: 60.9° C.

Production Example 5

Polymer (5) was obtained in the same manner as in Production Example 1 except that the first-stage polymerization reaction was carried out at 75° C. for 6 hours using 1 part by weight of the exemplary compound (1-2) and 1.5 parts by weight of the exemplary compound (1-3) as radical polymerization initiators and the second-stage polymerization reaction was carried out at 105° C. for 7 hours.

The polymer (5) thus obtained had Mw: 16,900, Mn: 7,700, Mw/Mn: 2.2 and Tg: 59.7° C.

Production Example 6

Polymer (6) was obtained in the same manner as in Production Example 1 except that the first-stage polymerization reaction was carried out at 113° C. for 4 hours using the exemplary compound (3-3) as the radical polymerization initiator and the second-stage polymerization reaction was carried out at 140° C. for 5 hours.

The polymer (6) thus obtained had Mw: 21,900, Mn: 9,500, Mw/Mn: 2.3 and Tg: 61.1° C.

Production Example 7

Polymer (7) was obtained in the same manner as in Production Example 1 except that in the first-stage polymerization reaction the monomers of the first monomer composition were replaced with 57 parts by weight of styrene monomer and 6 parts by weight of butyl acrylate monomer and in the second-stage polymerization reaction the monomers of the second monomer composition were replaced with 20 parts by weight of styrene monomer and 17 parts by weight of butyl acrylate monomer.

The polymer (7) thus obtained had Mw: 23,400, Mn: 9,100, Mw/Mn: 2.6 and Tg: 58.2° C.

Production Example 8

Polymer (8) was obtained in the same manner as in Production Example 1 except that the first-stage polymerization reaction was carried out at 75° C. for 6 hours using the first monomer composition in which the reaction solvent was changed from xylene to toluene and also the exemplary compound (3-2) was used as the radical polymerization initiator, thereafter the temperature of the reaction vessel was raised to 90° C. to carry out reaction for 5 hours, and then the second-stage polymerization reaction was carried out.

The polymer (8) thus obtained had Mw: 23,500, Mn: 11,000, Mw/Mn: 2.1 and Tg: 60.9° C.

Production Example 9

Polymer (9) was obtained in the same manner as in Production Example 1 except that the first-stage polymerization reaction was carried out at 75° C. for 4 hours using a first monomer composition comprised of 50 parts by weight of styrene monomer, 2.2 parts by weight of the exemplary compound (3-2) as a radical polymerization initiator and 50 parts by weight of xylene, and then, after the temperature of the reaction vessel was raised to 90° C., a second monomer composition comprised of 22 parts by weight of butyl acrylate monomer, 2 parts by weight of the exemplary compound (2-5) as a radical polymerization initiator and 50 parts by weight of xylene was dropped over 2 hours, which was maintained at that temperature for 8 hours, and then, after the temperature of the reaction vessel was raised to 120° C., a monomer solution comprised of 28 parts by weight of styrene monomer and 50 parts by weight of xylene was dropped over 2 hours, which was maintained at that temperature for 4 hours until the polymerization reaction was completed.

The polymer (9) thus obtained had Mw: 20,800, Mn: 8,100, Mw/Mn: 2.6 and Tg: 53.3° C.

Production Example 10

Polymer (10) was obtained in the same manner as in Production Example 1 except that the first-stage polymerization reaction was carried out at 82° C. for 12 hours using the first monomer composition in which the monomers were replaced with 70 parts by weight of styrene monomer and the amount of the radical polymerization initiator was changed to 0.07 part by weight, thereafter the temperature of the reaction vessel was raised to 95° C., carrying out reaction for 10 hours, and then the second-stage polymerization reaction was carried out.

The polymer (10) thus obtained had Mw: 381,000, Mn: 148,000, Mw/Mn: 2.6 and Tg: 54.1° C.

Production Example 11

Polymer (11) was obtained in the same manner as in Production Example 1 except that the first-stage polymerization reaction was carried out at 98° C. for 10 hours using the first monomer composition comprised of 72 parts by weight of styrene monomer, 0.15 part by weight of the exemplary compound (3-3) as a radical polymerization initiator and 50 parts by weight of xylene, and then, after the temperature of the reaction vessel was raised to 123° C., 28 parts by weight of butyl acrylate monomer was dropped as the second monomer composition over 1 hour to, which was maintained at that temperature for 20 hours until the second-stage polymerization reaction was completed.

The polymer (11) thus obtained had Mw: 461,000, Mn: 177,000, Mw/Mn: 2.6 and Tg: 57.5° C.

Production Example 12

Polymer (12) was obtained in the same manner as in Production Example 9 except that the first-stage polymerization reaction was carried out using the first monomer composition in which the monomers were replaced with 72 parts by weight of styrene monomer and 0.005 part by weight of divinylbenzene monomer.

The polymer (12) thus obtained had Mw: 549,000, Mn: 189,000, Mw/Mn: 2.9 and Tg: 57.6° C.

Production Example 13

Polymer (13) was obtained in the same manner as in Production Example 10 except that the first-stage radical polymerization was carried out using a first monomer composition in which the monomers were replaced with 68 parts by weight of styrene monomer and 4 parts by weight of monobutyl maleate monomer.

The polymer (13) thus obtained had Mw: 473,000, Mn: 169,000, Mw/Mn: 2.8 and Tg: 57.9° C.

Production Example 14

Polymer (14) was obtained in the same manner as in Production Example 1 except that 50 parts by weight of the polymer (10) obtained in Production Example 10 was dissolved in 400 parts by weight of xylene and the solution obtained was introduced into the reaction vessel.

The polymer (14) thus obtained had Mw: 103,000, Mn: 97,000, Mw/Mn: 10.6 and Tg: 56.3° C.

Production Example 15

In Production Example 8, at the time when the first-stage polymerization reaction was completed, the reaction solvent toluene was distilled off under reduced pressure without heating if possible, obtaining intermediate (1) having, in its molecule, peroxide groups originating from the polymerization initiator.

A monomer composition was prepared which was comprised of this intermediate (1) in an amount giving 30 parts by weight of solid matter, 50 parts by weight of styrene monomer, 20 parts by weight of butyl acrylate monomer and 0.2 part by weight of t-amylperoxy-2-ethylhexanoate. Into a reaction vessel which has a reflux pipe, a stirrer, a thermometer and a nitrogen gas feed pipe and in which 250 parts by weight of deaerated deionized water containing 0.1% by weight of polyvinyl alcohol had been placed, the above monomer composition was introduced to prepare a suspension. The reaction vessel was heated to 73° C. at which reaction was carried out for 5 hours. Then,-the temperature of the reaction vessel was raised to 95° C. and reaction was further carried out for 2 hours until the polymerization reaction was completed. Suspension resin particles thus formed were filtered, followed by washing with water and then drying, obtaining polymer (15).

The polymer (15) thus obtained had Mw: 181,000, Mn: 14,500, Mw/Mn: 12.5 and Tg: 58.4° C.

Production Example 16

Polymer (16) was obtained in the same manner as in Production Example 15 except that the monomers in the monomer composition in which the intermediate (1) was dissolved were replaced with 50 parts by weight of styrene monomer, 20 parts by weight of butyl acrylate monomer and 0.01 part by weight divinylbenzene monomer.

The polymer (16) thus obtained had Mw: 238,000, Mn: 11,900, Mw/Mn: 20.0 and Tg: 58.1° C.

Production Example 17

Polymer (17) was obtained in the same manner as in Production Example 1 except that 14 parts by weight of a hydrocarbon wax having a melting point of 69.3° C. was added to 200 parts by weight of the xylene before the polymerization reaction was carried out.

The polymer (17) thus obtained had Mw: 23,100, Mn: 7,900, Mw/Mn: 2.9 and Tg: 60.3° C.

Production Example 18

Polymer (18) was obtained in the same manner as in Production Example 11 except that 9 parts by weight of polypropylene wax having a melting point of 135° C. was added to 200 parts by weight of the xylene before the polymerization reaction was carried out.

The polymer (18) thus obtained had Mw: 482,000, Mn: 173,000, Mw/Mn: 2.8 and Tg: 56.7° C.

Production Example 19

Polymer (19) was obtained in the same manner as in Production Example 1 except that the radical polymerization initiator was used in an amount of 5 parts by weight in the polymerization reaction.

The polymer (19) thus obtained had Mw: 11,300, Mn: 4,500, Mw/Mn: 2.5 and Tg: 60.1° C.

Comparative Production Example 1

Into a reaction vessel having a reflux pipe, a stirrer, a thermometer, a nitrogen gas feed pipe and a dropping device, 200 parts by weight of purified xylene was put. The reaction vessel was heated to 110° C. while introducting nitrogen. A monomer composition comprised of 78 parts by weight of styrene monomer, 22 parts by weight of butyl acrylate monomer, 2.3 parts by weight of the exemplary compound (2-5) as a radical polymerization initiator and 100 parts by weight of xylene was dropped over 2 hours, and maintained at that temperature for 8 hours until the polymerization reaction was completed to obtain polymer (20).

The polymer (20) thus obtained had Mw: 13,200, Mn: 5,700, Mw/Mn: 2.3 and Tg: 60.4° C.

Figure 8:
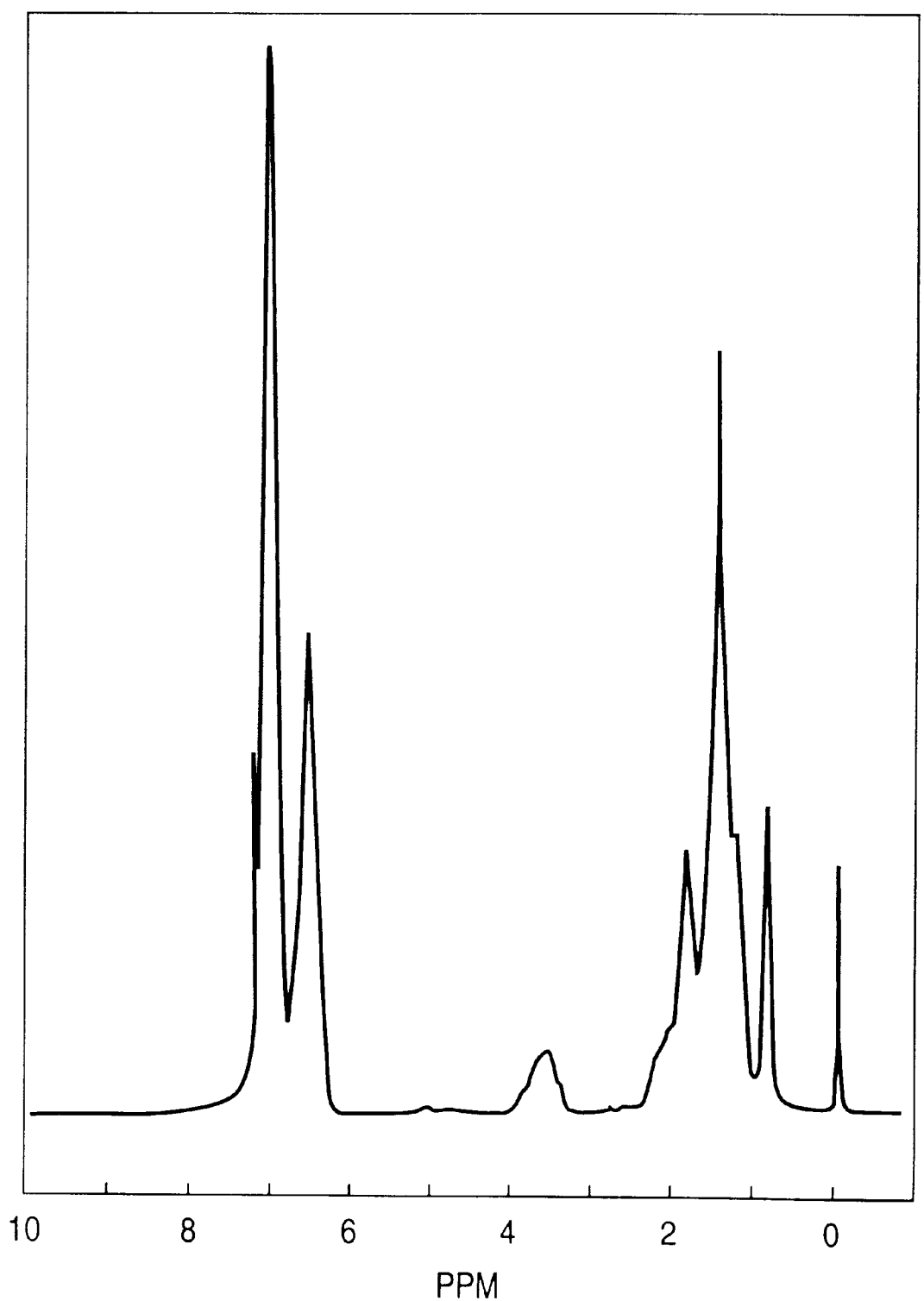
FIG. 8 is a chart showing a $^1$H-NMR spectrum of polymer (20) produced in Comparative Production Example 1.

The $^1$H NMR spectrum of the polymer (20) obtained was measured to obtain the results as shown in FIG. 8.

Comparative Production Example 2

Into an autoclave in which 250 parts by weight of deaerated deionized water containing 0.1% by weight of polyvinyl alcohol had been introduced, a monomer composition comprised of 78 parts by weight of styrene monomer, 22 parts by weight of butyl acrylate monomer and 0.15 part by weight of the exemplary compound (2-5) as a radical polymerization initiator was placed, and polymerization reaction was carried out at 90° C. for 8 hours. The reaction vessel was heated to 110° C. to and reaction was carried out for 3 hours to obtain polymer (21).

The polymer (21) thus obtained had Mw: 426,000, Mn: 164,000, Mw/Mn: 2.6 and Tg: 60.9° C.

Comparative Production Example 3

Polymer (22) was obtained in the same manner as in Comparative Production Example 1 except that the radical polymerization initiator was replaced with 3 parts by weight of benzoyl peroxide.

The polymer (22) thus obtained had Mw: 12,100, Mn: 5,900, Mw/Mn: 2.1 and Tg: 60.1° C.

Comparative Production Example 4

Polymer (23) was obtained in the same manner as in Production Example 15 except that 30 parts by weight of the polymer (20) was used in place of the intermediate (1).

The polymer (23) thus obtained had Mw: 179,000, Mn: 7,900, Mw/Mn: 22.7 and Tg: 58.2° C.

EXAMPLE 1

|  | (by weight) |
|---|---|
| Polymer (1) | 70 parts |
| Styrene-butyl acrylate copolymer produced by suspension polymerization (Mw: 511,000, Mw/Mn: 2.6; Tg: 61.3° C. | 30 parts |

A mixture of the above resins was dissolved in an organic solvent into a uniform solution, followed by distilling off the organic solvent to obtain binder resin composition (A).

The binder resin composition (A) thus obtained had a glass transition temperature of 61.6° C., a number average molecular weight (Mn) of 12,200 and a weight average molecular weight (Mw) of 149,000.

|  |  | (by weight) |
|---|---|---|
| (a) | Binder resin composition (A) | 100 parts |
| (b) | Magnetic material (average particle diameter: 0.2 $\mu$m) | 90 parts |
| (c) | Monoazo metal complex (negative charge control agent) | 2 parts |
| (d) | Wax: polypropylene wax (wax obtained by copolymerizing about 5% by weight of ethylene; melting point: 135° C.; Mw: 8,500; Mn: 1,100) | 4 parts |

The above materials were pre-mixed by means of a Henschel mixer, and the mixture obtained was melt-kneaded at 130° C. using a twin-screw extruder. The kneaded product was cooled, and then crushed using a cutter mill. Thereafter the crushed product was finely pulverized by means of a grinding machine utilizing a jet stream. The finely pulverized product was classified using an air classifier to produce a negatively chargeable insulating magnetic toner particles (a magnetic toner) with a weight average particle diameter of 6.4 $\mu$m. To 100 parts by weight of this magnetic toner particles, 1.0 part by weight of a negatively chargeable hydrophobic dry-process silica (BET specific surface area: 300 m$^2$/g) was externally added using a Henschel mixer to obtain magnetic toner (1).

The toner thus obtained had, in molecular weight distribution as measured by GPC of the THF-soluble matter of the toner, a main peak at the molecular weight of 18,200 and a sub-peak at the molecular weight of 413,000.

To measure the rheological characteristics of this magnetic toner, the toner was heated and melted to prepare a columnar sample of about 8 mm in diameter and 3 mm in height. According to a conventional method, the sample was secured onto a serrated type of parallel plate to measure the temperature dependence of its storage elastic modulus and loss elastic modulus. The measurement results of the temperature dependence of these elastic moduli are shown in FIG. 1.

To evaluate the dispersiblity of wax, the above magnetic toner was set on an optical microscope provided with a polarized light plate, observing about 500 toner particles in the visual field at low magnification (about 30 magnifications). As a result, as bright spots that indicate the presence of free wax, only 9 to 10 points were seen in the visual field, showing a good result.

Using a digital copying machine (GP-215, manufactured by CANON INC.), the apparatus as shown in FIG. 5, this magnetic toner monomer composition was subjected to a running test of 100,000-sheet continuous image reproduction.

In the digital copying machine, the surface of a photosensitive drum having an OPC photosensitive layer on an aluminum cylinder of 30 mm diameter was charged to –700 V by the primary charging assembly, on which digital latent images were formed by image scanning with laser light. The latent images were reverse-developed using the negatively chargeable insulating magnetic toner triboelectrically charged by the developing sleeve internally provided with the stationary magnet having four magnetic poles (developing magnet pole: 950 gausses).

To the developing sleeve, a DC bias of –600 V and a AC bias with Vpp of 800 V (1,800 Hz) were applied. Magnetic toner images on the photosensitive drum were electrostatically transferred to sheets of plain paper by the transfer means. After removing the charges, the sheets of plain paper was separated from the photosensitive drum, and the magnetic toner images on the plain paper were fixed using a heat-pressure fixing means having a heating roller and a pressure roll.

In the 100,000-sheet running, the image density was 1.4 at the initial stage (1st to 10th sheet) and 1.43 at the last stage, showing little change. Line images were free from changes in image quality, for example, black spots around line images and crushed line images, showing good results. At the time the 100,000-sheet running was finished, the surface of the OPC photosensitive drum was examined in detail to confirm that no free wax was seen to adhere and also no conspicuous damage was seen on the surface of the OPC photosensitive drum. On the images too, no faulty images were seen which were presumed to be due to some damage on the OPC photosensitive drum surface.

Next, the fixing assembly of the digital copying machine was detached, and was so modified that an external drive system was attached to rotate the fixing roller at 150 mm/second and a temperature control system was attached to change the fixing roller temperature in the range from 100 to 250° C. A fixing test was made in a thermostatic chamber whose temperature was controlled to be 3 to 5° C. A power source was switched on after making sure that the fixing roller temperature became equal to the temperature of the interior of the chamber, and immediately after the upper roller (heating roller) reached 130° C., the fixing test was carried out using a transfer-receiving paper of 60 g/m$^2$. Subsequently, while the transfer-receiving paper was successively changed to those of 50 g/m$^2$, 80 g/m$^2$ and 120 g/m$^2$, the fixing test was repeated.

As the result of the fixing tests thus made, the rate of density decrease was 17% on the transfer-receiving paper of 60 g/m$^2$, and the rates of density decrease on the transfer-receiving papers of 50 g/m$^2$, 80 g/m$^2$ and 120 g/m$^2$ were 9%, 21% and 24%, respectively, which were in such a level that there was no problem in practical use.

Anti-blocking properties were also tested while the toner was left standing for 20 days in a thermostatic chamber whose temperature was controlled to be 50° C. As a result, no change in fluidity was seen, showing a good result.

Example 2

Magnetic toner (2) was obtained in the same manner as in Example 1 except that a uniform mixture of a low-melting wax with a high-melting wax was used which was prepared by melting and mixing 2 parts by weight of a hydrocarbon wax having a melting point of 69° C. and 3 parts by weight of the polypropylene wax having a melting point of 135° C. as used in Example 1.

Physical properties of the toner and the results of evaluation are shown in Tables 1 and 2 (2A–2B).

Example 3

Magnetic toner (3) was obtained in the same manner as in Example 1 except that the binder resin composition (A) was replaced with a binder resin composition (B) prepared by dissolving 70 parts by weight of the polymer (1) and 30 parts by weight of the polymer (13) in the organic solvent to uniformly mix them, followed by distilling off the solvent.

Physical properties of the toner and the results of evaluation are shown in Tables 1 and 2 (2A–2B).

Example 4

Magnetic toner (4) was obtained in the same manner as in Example 3 except that the wax was replaced with the wax used in Example 2.

Physical properties of the toner and the results of evaluation are shown in Tables 1 and 2 (2A–2B).

Example 5

Magnetic toner (5) was obtained in the same manner as in Example 4 except that the binder resin composition (A) was replaced with a binder resin composition (C) prepared by dissolving the following polymers in the organic solvent to form a uniform solution, followed by distilling off the solvent under reduced pressure.

| Binder resin: | (by weight) |
| --- | --- |
| Polymer (1) | 40 parts |
| Polymer (3) | 30 parts |
| Polymer (11) | 30 parts |

Physical properties of the toner and the results of evaluation are shown in Tables 1 and 2 (2A–2B).

Example 6

Magnetic toner (6) was obtained in the same manner as in Example 4 except that a binder resin composition (D) was used which was prepared using the following polymers in place of the polymers used to prepare the binder resin composition (A) in Example 1.

| Binder resin: | (by weight) |
| --- | --- |
| Polymer (7) | 70 parts |
| Polymer (11) | 30 parts |

Physical properties of the toner and the results of evaluation are shown in Tables 1 and 2 (2A–2B).

Example 7

Magnetic toner (7) was obtained in the same manner as in Example 4 except that a binder resin composition (E) was used which was prepared using the following polymers in place of the polymers used to prepare the binder resin composition (A) in Example 1.

| Binder resin: | (by weight) |
| --- | --- |
| Polymer (9) | 70 parts |
| Polymer (11) | 30 parts |

Physical properties of the toner and the results of evaluation are shown in Tables 1 and 2 (2A–2B).

Example 8

Magnetic toner (8) was obtained in the same manner as in Example 4 except that a binder resin composition (F) was used which was prepared using the following polymers in place of the polymers used to prepare the binder resin composition (A) in Example 1.

| Binder resin: | (by weight) |
| --- | --- |
| Polymer (1) | 20 parts |
| Polymer (13) | 30 parts |

Styrene-butyl acrylate copolymer produced by solution polymerization (Mw: 17,500, Mw/Mn: 2.3; Tg: 61.0° C.) 50 parts Physical properties of the toner and the results of evaluation are shown in Tables 1 and 2 (2A–2B).

Example 9

Magnetic toner (9) was obtained in the same manner as in Example 4 except tha a binder resin composition (G) was used which was prepared using the following polymers in place of the polymers used to prepare the binder resin composition (A) in Example 1.

| Binder resin: | (by weight) |
| --- | --- |
| Polymer (1) | 20 parts |
| Polymer (13) | 10 parts |

Styrene-butyl acrylate copolymer used in Example 1, produced by suspension polymerization 20 parts
Styrene-butyl acrylate copolymer used in Example 8, produced by solution polymerization 50 parts Physical properties of the toner and the results of evaluation are shown in Tables 1 and 2 (2A–2B).

Example 10

Magnetic toner (10) was obtained in the same manner as in Example 2 except that a binder resin composition (H) was used which was prepared using the following polymers in place of the polymers used to prepare the binder resin composition (A) in Example 1.

| Binder resin: | (by weight) |
| --- | --- |
| Polymer (17) | 74 parts |
| Polymer (11) | 30 parts |

Physical properties of the toner and the results of evaluation are shown in Tables 1 and 2 (2A–2B).

Example 11

Magnetic toner (11) was obtained in the same manner as in Example 2 except that a binder resin composition (I) was used which was prepared using the following polymers in place of the polymers used to prepare the binder resin composition (A) in Example 1.

| Binder resin: | (by weight) |
| --- | --- |
| Polymer (17) | 74 parts |
| Polymer (18) | 32 parts |

Physical properties of the toner and the results of evaluation are shown in Tables 1 and 2 (2A–2B).

Reference Example 1

Magnetic toner (12) was obtained in the same manner as in Example 1 except that a binder resin composition (J) was used which was prepared using the polymer (19) in place of the polymer (1) used to prepare the binder resin composition (A) in Example 1.

Physical properties of the toner and the results of evaluation are shown in Tables 1 and 2 (2A–2B).

Comparative Example 1

Comparative magnetic toner (1) was obtained in the same manner as in Example 1 except that a binder resin composition (K) was used which was prepared using the polymer (20) in place of the polymer (1) used to prepare the binder resin composition (A) in Example 1.

Figure 4:
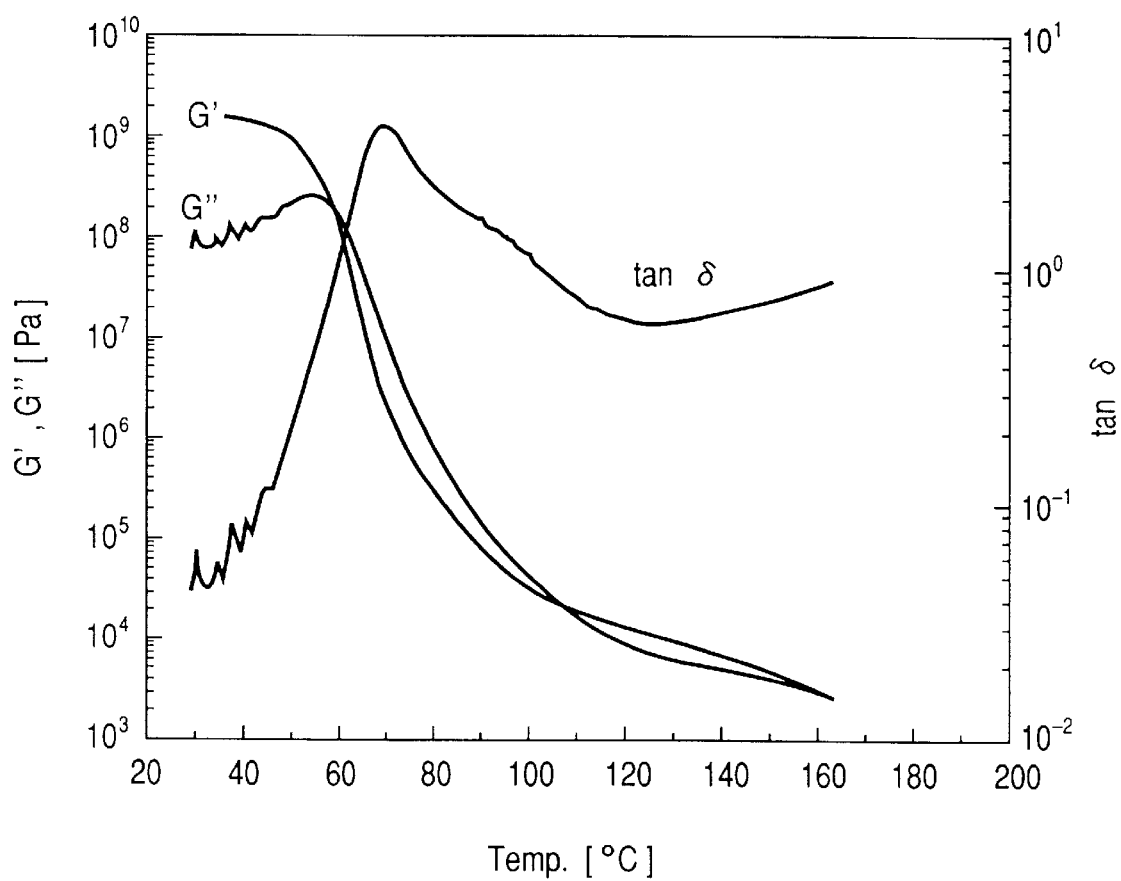
FIG. 4 is a graph showing Theological characteristics of a comparative toner.

To measure the rheological characteristics of this magnetic toner, the toner was heated and melted to prepare a columnar sample of about 8 mm in diameter and 3 mm in height, and, according to a conventional method, the sample was secured onto a serrated type of parallel plate to measure the temperature dependence of its storage elastic modulus and loss elastic modulus. The measurement results of the temperature dependence of these elastic moduli are shown in FIG. 4.

This comparative magnetic toner (1) was evaluatedin the same manner as in Example 1. As shown in Tables 1 and 2 (2A–2B), the results obtained was clearly inferior.

Comparative Example 2

Comparative magnetic toner (2) was obtained in the same manner as in Example 2 except that the binder resin composition (A) was replaced with 100 parts by weight of the polymer (23).

Physical properties of the toner and the results of evaluation are shown in Tables 1 and 2 (2A–2B).

Comparative Example 3

Comparative magnetic toner (3) was obtained in the same manner as in Example 1 except that a binder resin composition (L) was used which was prepared using 70 parts by weight of the polymer (22) and 30 parts by weight of the polymer (21) in place of the polymer (1) and styrene-butyl acrylate copolymer produced by suspension polymerization which were used to prepare the binder resin composition (A) in Example 1.

Physical properties of the toner and the results of evaluation are shown in Tables 1 and 2 (2A–2B).

Comparative Example 4

Comparative magnetic toner (4) was obtained in the same manner as in Example 1 except that binder resin composition (M) was used which was prepared using 70 parts by weight of the polymer (20) and 30 parts by weight of the polymer (22) in place of the polymer (1) and styrene-butyl acrylate copolymer produced by suspension polymerization which were used to prepare the binder resin composition (A) in Example 1.

Physical properties of the toner and the results of evaluation are shown in Tables 1 and 2 (2A–2B).

Evaluation methods are described below.
Evaluation of Fixing Performance (Heating roller surface temperature: 110° C.)

Unfixed toner images formed on a transfer-receiving paper of 50 g/m$^2$, 60 g/m$^2$, 80 g/m$^2$ or 120 g/m$^2$ were fixed at a heating roller surface temperature of 110° C., and the fixed images were rubbed 10 times with Silbon paper (lens cleaning paper "DASPER", trade name; available from Ozu Paper Co., Ltd.) under a load of 50 g/m$^2$, measuring the rate of density decrease before and after the rubbing.

Rank 10: Rate of density decrease, less than 1%
Rank 9: Rate of density decrease, 1 to 5%
Rank 8: Rate of density decrease, 6 to 10%
Rank 7: Rate of density decrease, 11 to 15%
Rank 6: Rate of density decrease, 16 to 20%
Rank 5: Rate of density decrease, 21 to 25%
Rank 4: Rate of density decrease, 26 to 30%
Rank 3: Rate of density decrease, 31 to 35%
Rank 2: Rate of density decrease, 36 to 40%
Rank 1: Rate of density decrease, more than 40%

Anti-offset Properties (Heating roller surface temperature: 210° C.)

Unfixed toner images formed on a transfer-receiving paper of 50 g/m$^2$ or 120 g/m$^2$ were fixed at a heating roller surface temperature of 210° C., and anti-offset properties were evaluated according to whether or not the toner transferred to the surface of the heating roller.

Rank 5: No toner transfers.
Rank 4: Toner transfers in a very small quantity.
Rank 3: Toner transfers in a small quantity.
Rank 2: Toner transfers conspicuously.
Rank 1: Paper winds around the heating roller.

Anti-blocking Properties (Temperature: 50° C., for 10 days)

About 20 g of toner was put into a plastic bottle, and was left standing at 50° C. for 10 days. Thereafter, evaluation was made visually.

Rank 5: No change
Rank 4: Agglomerates are seen, but easily broken.
Rank 3: Agglomerates are hard to break.
Rank 2: No fluidity is seen.
Rank 1: Caking occurs.

Image Density

Solid black area maximum image density (maximum image density at areas free of the edge effect) was measured using Macbeth RD918 (manufactured by Macbeth Co.)

Evaluation of Dispersibility of Wax in Toner

The toner was set on an optical microscope provided with a polarized light plate to observe toner particles at low magnification (e.g., about 50 to 100 magnifications), and the number of bright spots indicating the presence of wax particles liberated from toner particles per 300 toner particles was counted. Rank 5: No bright spot is seen through the polarized light plate.

Rank 4: 1 to 10 bright spots.
Rank 3: 11 to 20 bright spots.
Rank 2: 21 to 50 bright spots.
Rank 1: More than 50 bright spots are seen.

TABLE 1

| | Binder resin composition, or polymer | Glass transition temp. (Tg: °C.) | Number average molecular weight (Mn) | weight average molecular weight (Mw) | Molecular weight distribution measured by GPC of THF-soluble matter of toner Peak position | |
|---|---|---|---|---|---|---|
| | | | | | Main peak | Sub-peak |
| Example: | | | | | | |
| 1 | Binder resin comp. (A) | 61.6 | 12,200 | 149,000 | 18,200 | 413,000 |
| 2 | Binder resin comp. (A) | 61.5 | 12,100 | 147,000 | 18,100 | 413,000 |
| 3 | Binder resin comp. (B) | 59.7 | 12,300 | 116,000 | 18,300 | 368,000 |
| 4 | Binder resin comp. (B) | 59.3 | 12,400 | 118,000 | 18,500 | 366,000 |
| 5 | Binder resin comp. (C) | 60.1 | 13,500 | 133,000 | 20,300 | 409,000 |
| 6 | Binder resin comp. (D) | 57.9 | 15,400 | 136,000 | 22,700 | 412,000 |
| 7 | Binder resin comp. (E) | 55.5 | 14,300 | 142,000 | 21,300 | 434,000 |
| 8 | Binder resin comp. (F) | 60.3 | 11,500 | 146,000 | 17,400 | 443,000 |
| 9 | Binder resin comp. (G) | 59.9 | 11,900 | 141,000 | 17,700 | 432,000 |
| 10 | Binder resin comp. (H) | 58.6 | 13,900 | 143,000 | 20,800 | 425,000 |
| 11 | Binder resin comp. (I) | 58.3 | 14,100 | 146,000 | 21,100 | 439,000 |
| Ref. Ex. 1 | Binder resin comp. (J) | 59.7 | 7,100 | 123,000 | 10,300 | 428,000 |
| Comparative Example: | | | | | | |
| 1 | Binder resin comp. (K) | 60.8 | 5,500 | 158,000 | 11,800 | 449,000 |
| 2 | Polymer (23) | 58.2 | 7,900 | 179,000 | — | 168,000 |
| 3 | Binder resin comp. (L) | 60.7 | 7,400 | 122,000 | 12,300 | 394,000 |
| 4 | Binder resin comp. (N) | 60.8 | 8,100 | 125,000 | 11,900 | 384,000 |

TABLE 2A

| | Rheological characteristics of toner | | | | | | DSC curve of toner | |
|---|---|---|---|---|---|---|---|---|
| | $G'/G'' = 1.0$ at: | | | | | | Endothermic peak | |
| | Temp. (°C.) | Elastic modulus (Pa) | $G'_{40}/G'_{50}$ | $G'_{50}/G'_{60}$ | $G'_{70}/G'_{100}$ | $G'_{110}/G'_{140}$ | Main peak (°C.) | Sub-peak or shoulder (°C.) |
| Example: | | | | | | | | |
| 1 | 60.3 | $9.3 \times 10^7$ | 2.2 | 6.8 | 90 | 3.3 | 134.6 | — |
| 2 | 63.9 | $9.1 \times 10^7$ | 2.3 | 6.0 | 130 | 3.1 | 70.9 | 133.9 |
| 3 | 61.9 | $7.2 \times 10^7$ | 2.5 | 5.6 | 115 | 4.3 | 134.5 | — |
| 4 | 60.3 | $6.3 \times 10^7$ | 2.6 | 6.6 | 180 | 5.1 | 71.1 | 134.1 |
| 5 | 61.0 | $6.1 \times 10^7$ | 2.5 | 7.0 | 80 | 3.0 | 70.4 | 134.0 |
| 6 | 59.4 | $6.9 \times 10^7$ | 2.2 | 8.7 | 105 | 4.0 | 70.6 | 133.7 |
| 7 | 58.1 | $6.1 \times 10^7$ | 2.1 | 15 | 120 | 3.7 | 70.6 | 134.2 |
| 8 | 63.4 | $4.5 \times 10^7$ | 2.0 | 5.2 | 170 | 2.4 | 133.7 | — |
| 9 | 63.6 | $4.2 \times 10^7$ | 2.0 | 6.4 | 145 | 2.5 | 134.0 | — |
| 10 | 60.8 | $7.2 \times 10^7$ | 2.9 | 7.9 | 160 | 5.0 | 70.3 | 136.2 |
| 11 | 61.0 | $5.1 \times 10^7$ | 2.8 | 7.6 | 155 | 5.2 | 72.0 | 135.9 |
| Ref. Ex. 1 | 60.1 | $1.4 \times 10^8$ | 1.7 | 4.2 | 240 | 2.2 | 71.1 | 134.3 |
| Comparative Example: | | | | | | | | |
| 1 | 58.7 | $2.0 \times 10^4$ | 1.1 | 2.8 | 316 | 1.6 | 134.1 | — |
| 2 | 60.9 | $1.9 \times 10^4$ | 1.4 | 3.1 | 290 | 1.2 | 134.4 | — |
| 3 | 59.5 | $1.6 \times 10^4$ | 1.3 | 6.9 | 40 | 1.0 | 133.9 | — |
| 4 | 62.1 | $1.8 \times 10^4$ | 1.1 | 2.4 | 330 | 1.3 | 134.2 | — |

TABLE 2B

| | Image density | | Fixing test Paper of: | | | | Hot offset test Paper of: | | Wax dis-persion | Block-ing test* |
| --- | --- | --- | --- | --- | --- | --- | --- | --- | --- | --- |
| | Initial stage | After running | 50 g/m² | 60 g/m² | 80 g/m² | 120 g/m² | 50 g/m² | 120 g/m² | | |
| Example: | | | | | Rank: | | | | | |
| 1 | 1.4 | 1.43 | 8 | 6 | 5 | 5 | 5 | 5 | 4 | 5 |
| 2 | 1.4 | 1.4 | 8 | 7 | 6 | 6 | 4 | 5 | 4 | 4 |
| 3 | 1.45 | 1.45 | 8 | 7 | 7 | 6 | 5 | 5 | 4 | 5 |
| 4 | 1.43 | 1.45 | 8 | 8 | 8 | 6 | 4 | 5 | 4 | 4 |
| 5 | 1.44 | 1.47 | 9 | 8 | 8 | 7 | 5 | 5 | 4 | 4 |
| 6 | 1.45 | 1.45 | 10 | 9 | 8 | 8 | 4 | 5 | 4 | 4 |
| 7 | 1.43 | 1.45 | 10 | 10 | 9 | 8 | 4 | 5 | 4 | 4 |
| 8 | 1.35 | 1.36 | 7 | 6 | 5 | 5 | 5 | 5 | 3 | 3 |
| 9 | 1.37 | 1.42 | 7 | 7 | 6 | 5 | 5 | 5 | 3 | 4 |
| 10 | 1.48 | 1.45 | 8 | 7 | 7 | 6 | 4 | 5 | 4 | 4 |
| 11 | 1.47 | 1.48 | 9 | 8 | 7 | 6 | 5 | 5 | 5 | 5 |
| Ref. Ex. 1 | 1.36 | 1.34 | 8 | 7 | 6 | 5 | 4 | 3 | 3 | 3 |
| Comparative Example: | | | | | | | | | | |
| 1 | 1.2 | 1.25 | 2 | 1 | 1 | 1 | 5 | 5 | 2 | 5 |
| 2 | 1.15 | 1.2 | 3 | 2 | 2 | 1 | 2 | 2 | 1 | 2 |
| 3 | 1.0 | 1.05 | 3 | 3 | 2 | 2 | 1 | 2 | 2 | 1 |
| 4 | 1.1 | 0.95 | 3 | 2 | 1 | 1 | 3 | 3 | 2 | 3 |

*left at 50° C. for 20 days

What is claimed is:

1. A toner for developing an electrostatic image, comprising;
a binder resin, a colorant and a wax, wherein;
said toner has the following rheological characteristics:
(a) a temperature at which a ratio of a loss elastic modulus to a storage elastic modulus (G''/G'=tan δ) comes to be 1.0 is present in a temperature range of from 55° C. to 70° C., with an elastic modulus being $1.5 \times 10^8$ Pa or below;
(b) a ratio of the storage elastic modulus at a temperature of 40° C. ($G'_{40}$) to the storage elastic modulus at a temperature of 50° C. ($G'_{50}$), $G'_{40}/G'_{50}$, is from 1.8 to 4.0;
(c) a ratio of the storage elastic modulus at a temperature of 50° C. ($G'_{50}$) to the storage elastic modulus at a temperature of 60° C. ($G'_{60}$), $G'_{50}/G'_{60}$, is from 3 to 20;
(d) a ratio of the storage elastic modulus at a temperature of 70° C. ($G'_{70}$) to the storage elastic modulus at a temperature of 100° C. ($G'_{100}$), $G'_{70}/G'_{100}$ is from 50 to 250; and
(e) a ratio of the storage elastic modulus at a temperature of 110° C. ($G'_{110}$) to the storage elastic modulus at a temperature of 140° C. ($G'_{140}$), $G'_{110}/G'_{140}$, is from 2 to 20.

2. The toner according to claim 1, wherein the temperature at which the ratio G''/G' comes to be 1.0 is present in a temperature range from 59° C. to 65° C., and the elastic modulus at such temperature is from $3 \times 10^7$ Pa to $1.0 \times 10^8$ Pa.

3. The toner according to claim 1, wherein a fluidity-improving agent is externally added to said toner.

4. The toner according to claim 1, wherein the ratio of the storage elastic modulus $G'_{40}$ to the storage elastic modulus $G'_{50}$, $G'_{40}/G'_{50}$, is from 2.0 to 3.5.

5. The toner according to claim 1, wherein the ratio of the storage elastic modulus $G'_{50}$ to the storage elastic modulus $G'_{60}$, $G'_{50}/G'_{60}$, is from 4 to 15.

6. The toner according to claim 1, wherein the ratio of the storage elastic modulus $G'_{50}$ to the storage elastic modulus $G'_{60}$, $G'_{50}/G'_{60}$, is from 5 to 10.

7. The toner according to claim 1, wherein the ratio of the storage elastic modulus $G'_{70}$ to the storage elastic modulus $G'_{100}$, $G'_{70}/G'_{100}$, is from 60 to 240.

8. The toner according to claim 1, wherein the ratio of the storage elastic modulus $G'_{70}$ to the storage elastic modulus $G'_{100}$, $G'_{70}/G'_{100}$, is from 70 to 220.

9. The toner according to claim 1, wherein the ratio of the storage elastic modulus $G'_{110}$, to the the storage elastic modulus $G'_{140}$, $G'_{110}/G'_{140}$, is from 2.5 to 18.

10. The toner according to claim 1, wherein the ratio of the storage elastic modulus $G'_{110}$ to the storage elastic modulus $G'_{140}$, $G'_{110}/G'_{140}$, is from 3 to 15.

11. The toner according to claim 1, wherein said binder resin contains a block copolymer having an aromatic vinyl monomer unit and an acrylate or methacrylate monomer unit.

12. The toner according to claim 11, wherein said block copolymer is contained in said binder resin in an amount not less than 10% by weight based on the total weight of the binder resin.

13. The toner according to claim 11, wherein said block copolymer is contained in said binder resin in an amount not less than 25% by weight based on the total weight of the binder resin.

14. The toner according to claim 11, wherein said block copolymer is a block copolymer synthesized by subjecting an aromatic vinyl monomer and an acrylate or methacrylate monomer to radical polymerization during which a polymerization temperature is changed by at least 5° C., in the presence of a radical polymerization initiator having at least two peroxide groups in a molecule and having a difference of at least 5° C. in 10-hour half-life temperature at which cleavage reaction of each peroxide group takes place.

15. The toner according to claim 11, wherein said block copolymer is a block copolymer synthesized by subjecting an aromatic vinyl monomer and an acrylate or methacrylate monomer to radical polymerization during which the polymerization temperature is changed by at least 5° C., in the presence of a radical polymerization initiator represented by the following chemical formula (1), (2), (3) or (4).

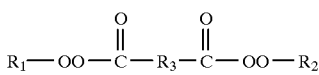
(1)

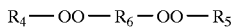
(2)

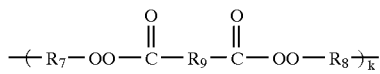
(3)

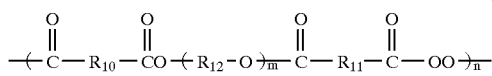
(4)

wherein $R_1$ to $R_{12}$, which may be the same or different, each represent a straight-chain, branched or cyclic alkyl group having 2 to 30 carbon atoms or an aryl group having 6 to 20 carbon atoms; k and n each represent an integer of 2 to 50; and m represents an integer of 1 to 20.

16. The toner according to claim 11, wherein said block copolymer is synthesized through the steps of carrying out polymerization reaction at different temperatures in at least two stages; said steps comprising;
  (i) first-stage polymerization reaction carried out by subjecting an aromatic vinyl monomer alone or a monomer composition prepared by mixing an aromatic vinyl monomer and an acrylate or methacrylate monomer in a weight ratio of from 20:1 to 1:1 and a monomer composition containing a radical polymerization initiator represented by the following chemical formula (1), (2), (3) or (4), to polymerization reaction at a temperature of from 50° C. to 120° C.; and
  (ii) second-stage polymerization reaction carried out by adding again an acrylate or methacrylate monomer alone or a monomer composition prepared by mixing an aromatic vinyl monomer and an acrylate or methacrylate monomer in a weight ratio of 1:20 to 1:1, followed by polymerization at a temperature at least 5° C. higher than that in the first-stage polymerization reaction:

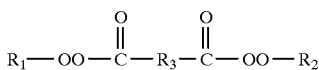
(1)

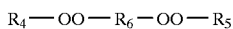
(2)

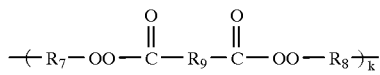
(3)

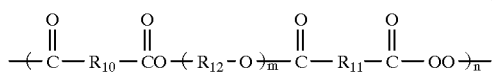
(4)

wherein $R_1$ to $R_{12}$, which may be the same or different, each represent a straight-chain, branched or cyclic alkyl group having 2 to 30 carbon atoms or an aryl group having 6 to 20 carbon atoms; k and n each represent an integer of 2 to 50; and m represents an integer of 1 to 20.

17. The toner according to claim 11, wherein said block copolymer is synthesized through the steps of carrying out polymerization reaction at different temperatures in at least two stages; said steps comprising;
  (i) polymerization reaction carried out by subjecting an acrylate or methacrylate monomer alone or a monomer composition prepared by mixing an aromatic vinyl monomer and an acrylate or methacrylate monomer in a weight ratio of 1:20 to 1:1 and a monomer composition containing a radical polymerization initiator represented by the following chemical formula (1), (2), (3) or (4), to polymerization reaction at a temperature of from 50° C. to 120° C.; and
  (ii) polymerization reaction carried out by again adding again an aromatic vinyl monomer alone or a monomer composition prepared by mixing an aromatic vinyl monomer and an acrylate or methacrylate monomer in a weight ratio of 20:1 to 1:1, followed by polymerization at a temperature of 55° C. or above.

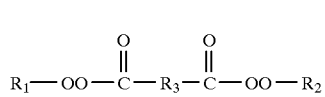
(1)

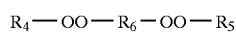
(2)

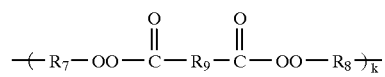
(3)

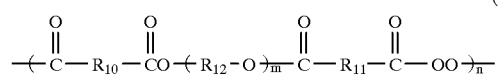
(4)

wherein $R_1$ to $R_{12}$, which may be the same or different, each represent a straight-chain, branched or cyclic alkyl group having 2 to 30 carbon atoms or an aryl group having 6 to 20 carbon atoms; k and n each represent an integer of 2 to 50; and m represents an integer of 1 to 20.

18. The toner according to claim 1, wherein said binder resin has a glass transition temperature of 40° C. to 80° C.

19. The toner according to claim 1, wherein said binder resin has a glass transition temperature of 45° C. to 80° C.

20. The toner according to claim 1, wherein said binder resin has a number average molecular weight Mn of 2,500 to 50,000 and a weight average molecular weight Mw of 10,000 to 1,500,000.

21. The toner according to claim 1, wherein said binder resin has a number average molecular weight Mn of 3,000 to 20,000 and a weight average molecular weight Mw of 25,000 to 1,250,000.

22. The toner according to claim 1, wherein said toner has, in molecular weight distribution as measured by gel permeation chromatography of a THF-soluble matter of the toner, a peak in each of molecular weight region from 12,000 to 40,000 and a molecular weight region from 50,000 to 1,200,000.

23. The toner according to claim 1, wherein said toner has, in molecular weight distribution as measured by gel permeation chromatography of a THF-soluble matter of the toner, a peak in each of a molecular weight region from 13,000 to 40,000 and a molecular weight region from 80,000 to 1,100,000.

24. The toner according to claim 1, wherein in molecular weight distribution as measured by gel permeation chromatography of a THF-soluble matter of the toner, a ratio of an area (L) of a low-molecular weight region not more than 45,000 to an area (H) of a high-molecular weight region more than 45,000 satisfies the following relation, (L):(H)=1:9 to 9.5:0.5.

25. The toner according to claim 1, wherein in molecular weight distribution as measured by gel permeation chromatography of a THF-soluble matter of the toner, the ratio of an area (L) of a low-molecular weight region not more than 45,000 to an area (H) of a high-molecular weight region of more than 45,000 satisfies the following relation, (L):(H)=2:8 to 9:1.

26. The toner according to claim 1, wherein said toner has, in a DSC curve as measured using a differential scanning calorimeter, an endothermic main peak in a temperature region from 65° C. to 160° C.

27. The toner according to claim 1, wherein said toner has, in the DSC curve as measured using a differential scanning calorimeter, an endothermic main peak in a temperature region of from 70° C. to 160° C.

28. The toner according to claim 1, wherein said toner has, in the DSC curve as measured using a differential scanning calorimeter, (i) an endothermic main peak and (ii) an endothermic sub-peak or endothermic shoulder in a temperature region of from 72° C. to 155° C.

29. The toner according to claim 1, wherein said wax has a melting point of from 65° C. to 160° C.

30. The toner according to claim 1, wherein said wax comprises a low-melting wax component having a melting point of 65° C. to 119° C. and a high-melting wax component having a melting point of 120° C. to 160° C.

31. The toner according to claim 1, wherein said toner is a magnetic toner containing a magnetic material as the colorant.

32. The toner according to claim 31, wherein said magnetic toner further contains a pigment or a dye in addition to the magnetic material.

33. The toner according to claim 1, wherein said toner is a non-magnetic toner containing a pigment or a dye as the colorant.

34. An image forming method comprising;

developing an electrostatic latent image held on an electrostatic latent image bearing member, by the use of a toner to form a toner image;

transferring the toner image to a recording medium; and heat-fixing the toner image transferred to the recording medium, by means of a heat fixing means;

wherein;

said toner comprises a binder resin, a colorant and a wax, and said toner has the following rheological characteristics:

(a) A temperature at which a ratio of a loss elastic modulus to a storage elastic modulus (G"/G'=tan δ) comes to be 1.0 is present in a temperature range of from 55° C. to 70° C., with an elastic modulus being $1.5 \times 10^8$ Pa or below;

(b) a ratio of the storage elastic modulus at a temperature of 40° C. ($G'_{40}$) to the storage elastic modulus at a temperature of 50° C. ($G'_{50}$), $G'_{40}/G'_{50}$, is from 1.8 to 4.0;

(c) a ratio of the storage elastic modulus at a temperature of 50° C. ($G'_{50}$) to the storage elastic modulus at a temperature of 60° C. ($G'_{60}$), $G'_{50}/G'_{60}$, is from 3 to 20;

(d) a ratio of the storage elastic modulus at a temperature of 70° C. ($G'_{70}$) to the storage elastic modulus at a temperature of 100° C. ($G'_{100}$), $G'_{70}/G'_{100}$, is from 50 to 250; and (e) a ratio of the storage elastic modulus at a temperature of 110° C. ($G'_{110}$) to the storage elastic modulus at a temperature of 140° C. ($G'_{140}$), $G'_{110}/G'_{140}$, is from 2 to 20.

35. The image forming method according to claim 34, wherein, in said toner, the temperature at which the ratio G'/G" comes to be 1.0 is present in a temperature range of from 59° C. to 65° C., and the elastic modulus at such temperature is from $3 \times 10^7$ Pa to $1.0 \times 10^8$ Pa.

36. The image forming method according to claim 34, wherein, in said toner, the ratio of the storage elastic modulus $G'_{40}$ to the storage elastic modulus $G'_{50}$, $G'_{40}/G'_{50}$, is from 2.0 to 3.5.

37. The image forming method according to claim 34, wherein, in said toner, the ratio of the storage elastic modulus $G'_{50}$, to the storage elastic modulus $G'_{60}$, $G'_{50}/G'_{60}$, is from 4 to 15.

38. The image forming method according to claim 34, wherein, in said toner, the ratio of the storage elastic modulus $G'_{50}$ to the storage elastic modulus $G'_{60}$, $G'_{50}/G'_{60}$, is from 5 to 10.

39. The image forming method according to claim 34, wherein, in said toner, the ratio of the storage elastic modulus $G'_{70}$ to the storage elastic modulus $G'_{100}$, $G'_{70}/G'_{100}$, is from 60 to 240.

40. The image forming method according to claim 34, wherein, in said toner, the ratio of the storage elastic modulus $G'_{70}$ to the storage elastic modulus $G'_{100}$, $G'_{70}/G'_{100}$, is from 70 to 220.

41. The image forming method according to claim 34, wherein, in said toner, the ratio of the storage elastic modulus $G'_{110}$ to the storage elastic modulus $G'_{140}$, $G'_{110}/G'_{140}$, is from 2.5 to 18.

42. The image forming method according to claim 34, wherein, in said toner, the ratio of the storage elastic modulus $G'_{110}$ to the storage elastic modulus $G'_{140}$, $G'_{110}/G'_{140}$, is from 3 to 15.

43. The image forming method according to claim 34, wherein said binder resin contains a block copolymer having an aromatic vinyl monomer unit and an acrylate or methacrylate monomer unit.

44. The image forming method according to claim 43, wherein said block copolymer is contained in said binder resin in an amount not less than 10% by weight based on the total weight of the binder resin.

45. The image forming method according to claim 43, wherein said block copolymer is contained in said binder resin in an amount not less than 25% by weight based on the total weight of the binder resin.

46. The image forming method according to claim 43, wherein said block copolymer is a block copolymer synthesized by subjecting an aromatic vinyl monomer and an acrylate or methacrylate monomer to radical polymerization during which a polymerization temperature is changed by at least 5° C., in the presence of a radical polymerization initiator having at least two peroxide groups in a molecule and having a difference of at least 5° C. in 10-hour half-life temperature at which cleavage reaction of each peroxide group takes place.

47. The image forming method according to claim 43, wherein said block copolymer is a block copolymer synthesized by subjecting an aromatic vinyl monomer and an acrylate or methacrylate monomer to radical polymerization during which the polymerization temperature is changed by at least 5° C., in the presence of a radical polymerization initiator represented by the following chemical formula (1), (2), (3) or (4),

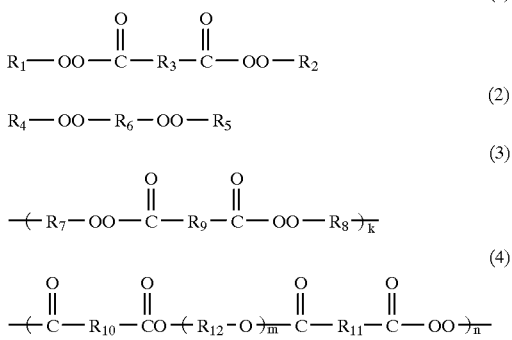

wherein $R_1$ to $R_{12}$, which may be the same or different, each represent a straight-chain, branched or cyclic alkyl group having 2 to 30 carbon atoms or an aryl group having 6 to 20 carbon atoms; k and n each represent an integer of 2 to 50; and m represents an integer of 1 to 20.

48. The image forming method according to claim 34, wherein said block copolymer is synthesized through the steps of carrying out polymerization reaction at different temperatures in at least two stages; said steps comprising;
(i) first-stage polymerization reaction carried out by subjecting an aromatic vinyl monomer alone or a monomer composition prepared by mixing an aromatic vinyl monomer and an acrylate or methacrylate monomer in a weight ratio of from 20:1 to 1:1 and a monomer composition containing a radical polymerization initiator represented by the following chemical formula (1), (2), (3) or (4), to polymerization reaction at a temperature of from 50° C. to 120° C.; and
(ii) second-stage polymerization reaction carried out by adding again an acrylate or methacrylate monomer alone or a monomer composition prepared by mixing an aromatic vinyl monomer and an acrylate or methacrylate monomer in a weight ratio of 1:20 to 1:1, followed by polymerization at a temperature at least 5° C. higher than that in the first-stage polymerization reaction:

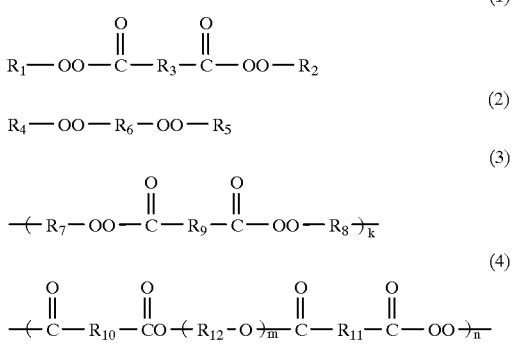

wherein $R_1$ to $R_{12}$, which may be the same or different, each represent a straight-chain, branched or cyclic alkyl group having 2 to 30 carbon atoms or an aryl group having 6 to 20 carbon atoms; k and n each represent an integer of 2 to 50; and m represents an integer of 1 to 20.

49. The image forming method according to claim 43, wherein said block copolymer is copolymer synthesized through the steps of carrying out polymerization reaction at different temperatures in at least two stages; said steps comprising;
(i) polymerization reaction carried out by subjecting an acrylate or methacrylate monomer alone or a monomer composition prepared by mixing an aromatic vinyl monomer and an acrylate or methacrylate monomer in a weight ratio of from 1:20 to 1:1 and a monomer composition containing a radical polymerization initiator represented by the following chemical formula (1), (2), (3) or (4), to polymerization reaction at a temperature of from 50° C. to 120° C.; and
(ii) polymerization reaction carried out by adding again an aromatic vinyl monomer alone or a monomer composition prepared by mixing an aromatic vinyl monomer and an acrylate or methacrylate monomer in a weight ratio of 20:1 to 1:1, followed by polymerization at a temperature of 55° C. or above.

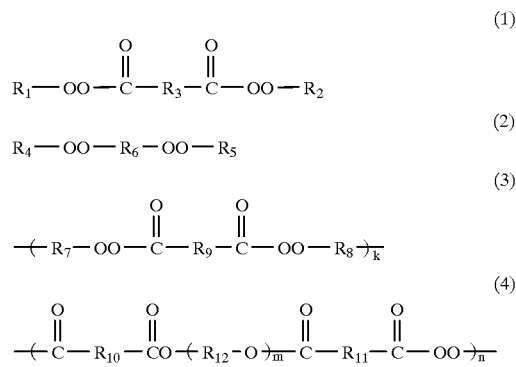

wherein $R_1$ to $R_{12}$, which may be the same or different, each represent a straight-chain, branched or cyclic alkyl group having 2 to 30 carbon atoms or an aryl group having 6 to 20 carbon atoms; k and n each represent an integer of 2 to 50; and m represents an integer of 1 to 20.

50. The image forming method according to claim 34, wherein said binder resin has a glass transition temperature of 40° C. to 80° C.

51. The image forming method according to claim 34, wherein said binder resin has a glass transition temperature of 45° C. to 80° C.

52. The image forming method according to claim 34, wherein said binder resin has a number average molecular weight Mn of 2,500 to 50,000 and a weight average molecular weight Mw of 10,000 to 1,500,000.

53. The image forming method according to claim 34, wherein said binder resin has a number average molecular weight Mn of 3,000 to 20,000 and a weight average molecular weight Mw of 25,000 to 1,250,000.

54. The image forming method according to claim 34, wherein said toner has, in molecular weight distribution as measured by gel permeation chromatography of a THF-soluble matter of the toner, a peak in each of a molecular weight rigion from 12,000 to 40,000 and a molecular weight of region from 50,000 to 1,200,000.

55. The image forming method according to claim 34, wherein said toner has, in molecular weight distribution as measured by gel permeation chromatography of a THF-soluble matter of the toner, a peak in each of a molecular weight region from 13,000 to 40,000 and a of molecular weight region from 80,000 to 1,100,000.

56. The image forming method according to claim 34, wherein in molecular weight distribution as measured by gel permeation chromatography of a THF-soluble matter of the toner, a ratio of an area (L) of a low-molecular weight region not more than 45,000 to an area (H) of a high-molecular weight region more than 45,000 satisfies the following relationship, (L):(H)=1:9 to 9.5:0.5.

57. The image forming method according to claim 34, wherein in molecular weight distribution as measured by gel permeation chromatography of a THF-soluble matter of the toner, the ratio of an area (L) of a low-molecular weight region not more than 45,000 to an area (H) of a high-molecular weight region more than 45,000 satisfies the following relation:

(L):(H)=2:8 to 9:1.

58. The image forming method according to claim 34, wherein said toner has, in a DSC curve as measured using a differential scanning calorimeter, an endothermic main peak in a temperature region from 65° C. to 160° C.

59. The image forming method according to claim 34, wherein said toner has, in a DSC curve as measured using a differential scanning calorimeter, an endothermic main peak in a temperature region from 70° C. to 160° C.

60. The image forming method according to claim 34, wherein said toner has, in a DSC curve as measured using a differential scanning calorimeter, (i) an endothermic main peak and (ii) an endothermic sub-peak or endothermic shoulder in a temperature region from 72° C. to 155° C.

61. The image forming method according to claim 34, wherein said wax has a melting point of from 65° C. to 160° C.

62. The image forming method according to claim 34, wherein said wax comprises a low-melting wax component having a melting point of 65° C. to 119° C. and a high-melting wax component having a melting point of 120° C. to 160° C.

63. The image forming method according to claim 34, wherein said toner is a magnetic toner containing a magnetic material as the colorant.

64. The image forming method according to claim 63, wherein said magnetic toner further contains a pigment or a dye in addition to the magnetic material.

65. The image forming method according to claim 34, wherein said toner is a non-magnetic toner containing a pigment or a dye as the colorant.

66. The image forming method according to claim 34, wherein a fluidity-improving agent is externally added to said toner.

67. The image forming method according to claim 34, wherein said electrostatic latent image bearing member comprises an electrophotographic photosensitive member.

68. The image forming method according to claim 34, wherein said heat fixing means is a heat-pressure roller fixing assembly having a heating roller and a pressure roller.

* * * * *

UNITED STATES PATENT AND TRADEMARK OFFICE
CERTIFICATE OF CORRECTION

PATENT NO.  : 5,955,234
DATED       : September 21, 1999
INVENTOR(S) : SATOSHI MATSUNAGA ET AL.

Page 1 of 10

It is certified that error appears in the above-identified patent and that said Letters Patent is hereby corrected as shown below:

ON THE TITLE PAGE [56] References Cited:

OTHER PUBLICATIONS, after, "Suyama et al", "1,1-Bis(butyldioxy-" should read --1,1-Bis(t-butyldioxy- --.

COLUMN 4:

Line 61, "$G'_{140}$is" should read --$G'_{140}$, is--.

COLUMN 5:

Line 19, "$G'_{60}$,is" should read --$G'_{60}$, is--; and
Line 38, "Theological" should read --rheological--.

COLUMN 6:

Line 12, "$1.5 \times 10^8$" should read --$1.5 \times 10^8$ Pa--;
Line 13, "According" should read "According to--;
Line 24, "$1.5 \times 10^8$" should read --$1.5 \times 10^8$ Pa--;
Line 33, "$1.5 \times 10^8$" should read --$1.5 \times 10^8$ Pa--; and
Line 36, "$G'_{50}/G'_{60}G'_{70}/G'_{100}$" should read --$G'_{50}/G'_{60}$, $G'_{70}/G'_{100}$--.

UNITED STATES PATENT AND TRADEMARK OFFICE
CERTIFICATE OF CORRECTION

PATENT NO.   : 5,955,234

DATED        : September 21, 1999

INVENTOR(S)  : SATOSHI MATSUNAGA ET AL.

It is certified that error appears in the above-identified patent and that said Letters Patent is hereby corrected as shown below:

COLUMN 8:

Line 43,

Line 57, "Exemplary compound (2-1)" should be deleted.

COLUMN 9:

Line 51, "Exemplary compound (3-1)" should be deleted.

COLUMN 10:

Line 9,

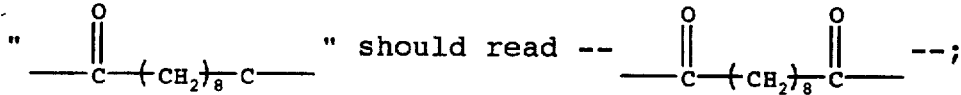

Line 14, "Exemplary compound (4-1)" should be deleted;

Line 18, 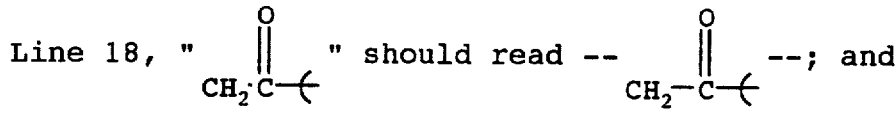

Line 25, 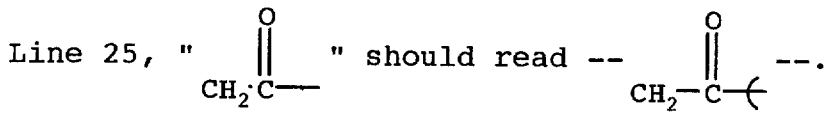

UNITED STATES PATENT AND TRADEMARK OFFICE
CERTIFICATE OF CORRECTION

PATENT NO. : 5,955,234
DATED : September 21, 1999
INVENTOR(S) : SATOSHI MATSUNAGA ET AL.

It is certified that error appears in the above-identified patent and that said Letters Patent is hereby corrected as shown below:

COLUMN 11:

Line 48, "mono-" should be deleted; and
Line 49, "mer" should be deleted.

COLUMN 13:

Line 55, "p-ethylstyrenee," should read
--p-ethylstyrene,--; and
Line 56, "p-n-hexylstyelene," should read
--p-n-hexylstyrene,--.

COLUMN 14:

Line 25, "furtherinclude" should read
--further include--.

COLUMN 15:

Line 10, "N,N'dioleyladipic" should read
--N,N'-dioleyladipic--;
Line 11, "N,N'dioleylsebacic" should read
--N,N'-dioleylsebacic--;
Line 13, "N,N'distearylisophthalic" should read
--N,N'-distearylisophthalic--; and
Line 46, "curvr" should read --curve--.

COLUMN 16:

Line 34, "a" should be deleted.

UNITED STATES PATENT AND TRADEMARK OFFICE
CERTIFICATE OF CORRECTION

PATENT NO.   : 5,955,234
DATED        : September 21, 1999
INVENTOR(S)  : SATOSHI MATSUNAGA ET AL.

It is certified that error appears in the above-identified patent and that said Letters Patent is hereby corrected as shown below:

COLUMN 18:

Line 50, "Theological" should read --rheological--; and
    Line 55, "Theological" should read --rheological--.

COLUMN 20:

Line 28, "Hanza" should read --Hansa--; and
    Line 63, "it" should be deleted.

COLUMN 21:

Line 6,

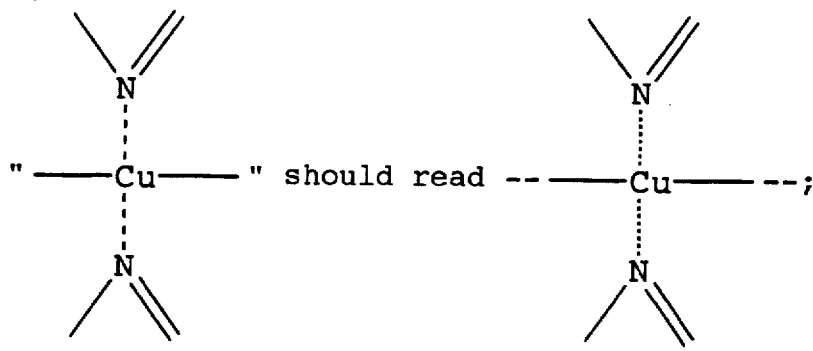

Line 35, "5" should be deleted.

COLUMN 22:

Line 39, "include" should read --include:--; and
    Line 50, "tirmethylsilyl" and "tirornanosilyl" should
        read --trimethysilyl-- and --triorganosilyl--.

UNITED STATES PATENT AND TRADEMARK OFFICE
CERTIFICATE OF CORRECTION

PATENT NO. : 5,955,234
DATED : September 21, 1999
INVENTOR(S) : SATOSHI MATSUNAGA ET AL.

It is certified that error appears in the above-identified patent and that said Letters Patent is hereby corrected as shown below:

COLUMN 23:

Line 26, "$H_2CNHCH_2CH_2CH_2Si(OC_2H_5)_2$" should read --$H_2CNH_2CH_2CH_2CH_2Si(OC_2H_5)_3$--; and
Line 59, "(cps)" should read --(cPs)--.

COLUMN 25:

Line 7, "Theological" should read --rheological--.

COLUMN 27:

Line 15, "assembly 2 ," should read --assembly 2,--;
Line 17, "(e.g.,a" should read --(e.g., a--;
Line 29, "means 8" should read --means 3--; and
Line 42, "means 8" should read --means--.

COLUMN 28:

Line 19, "used the" should read --used to regulate the--.

COLUMN 29:

Line 6, "is applied" should read --is applied,--.

COLUMN 30:

Line 33, "$^1$HNMR" should read --$^1$H NMR--.

UNITED STATES PATENT AND TRADEMARK OFFICE
CERTIFICATE OF CORRECTION

PATENT NO.   :  5,955,234

DATED        :  September 21, 1999

INVENTOR(S)  :  SATOSHI MATSUNAGA ET AL.

It is certified that error appears in the above-identified patent and that said Letters Patent is hereby corrected as shown below:

<u>COLUMN 33</u>:

Line 33, "Then,-the" should read --Then, the--.

<u>COLUMN 35</u>:

Line 21, "(μm)" should read --μm)--; and
  Line 34, "a" should be deleted.

<u>COLUMN 36</u>:

Line 8, "a AC" should read --an AC--.

UNITED STATES PATENT AND TRADEMARK OFFICE
CERTIFICATE OF CORRECTION

PATENT NO. : 5,955,234
DATED : September 21, 1999
INVENTOR(S) : SATOSHI MATSUNAGA ET AL.

It is certified that error appears in the above-identified patent and that said Letters Patent is hereby corrected as shown below:

COLUMN 38:

Lines 10, 11 and 12,

"

| Binder resin: | (by weight) |
|---|---|
| Polymer (1) | 20 parts |
| Polymer (13) | 30 parts |

Styrene-butyl acrylate copolymer produced by solution polymerization (Mw: 17,500, Mw/Mn: 2.3; Tg: 61.0°C.) 50 parts

"

should read

--

| Binder resin: | (by weight) |
|---|---|
| Polymer (1) | 20 parts |
| Polymer (13) | 30 parts |

Styrene-butyl acrylate copolymer produced by solution polymerization (Mw: 17,500, Mw/Mn: 2.3; Tg: 61.0°C) 50 parts

--

Line 17, "except tha" should read --except that--;

UNITED STATES PATENT AND TRADEMARK OFFICE
CERTIFICATE OF CORRECTION

PATENT NO. : 5,955,234

DATED : September 21, 1999

INVENTOR(S) : SATOSHI MATSUNAGA ET AL.

It is certified that error appears in the above-identified patent and that said Letters Patent is hereby corrected as shown below:

Line 28, 29, 30, and 31,

"

| Binder resin: | (by weight) |
|---|---|
| Polymer (1) | 20 parts |
| Polymer (13) | 10 parts |

Styrene-butyl acrylate copolymer used in Example 1, produced by suspension polymerization 20 parts Styrene-butyl acrylate copolymer used in Example 8, produced by solution polymerization 50 parts

"

should read

--

| Binder resin: | (by weight) |
|---|---|
| Polymer (1) | 20 parts |
| Polymer (13) | 10 parts |

Styrene-butyl acrylate copolymer used in example 1, produced by solution polymerization    20 parts Styrene-butyl acrylate copolymer used in Example 8, produced by solution polymerization    50 parts

--.

UNITED STATES PATENT AND TRADEMARK OFFICE
CERTIFICATE OF CORRECTION

PATENT NO. : 5,955,234
DATED : September 21, 1999
INVENTOR(S) : SATOSHI MATSUNAGA ET AL.

It is certified that error appears in the above-identified patent and that said Letters Patent is hereby corrected as shown below:

COLUMN 39:

Line 23, "evaluatedin" should read --evaluated in--; and
Line 39, "was" should read --were--.

COLUMN 40:

Line 60, "Rank 5:" should read --¶ Rank 5:--.

COLUMN 41:

Table 1, "weight average" should read --Weight average-- and "Pealk" should read --Peak--.

COLUMN 43:

Line 30, "ing;" should read --ing:--; and
Line 47, "($G'^{100}$), $G'_{70}/G'_{100}$" should read --($G'_{100}$), $G'_{70}/G'_{100}$,--.

COLUMN 44:

Line 35, "the the" should read --the--.

COLUMN 46:

Line 13, "again an" should read --an--; and
Line 55, "molecular" should read --a molecular--.

COLUMN 47:

Line 39, "comprising;" should read --comprising:--; and
Line 51, "A" should read --a--.

UNITED STATES PATENT AND TRADEMARK OFFICE
CERTIFICATE OF CORRECTION

PATENT NO. : 5,955,234
DATED : September 21, 1999
INVENTOR(S) : SATOSHI MATSUNAGA ET AL.

It is certified that error appears in the above-identified patent and that said Letters Patent is hereby corrected as shown below:

COLUMN 48:

Line 7, "G'G"" should read --G"/G'--;
Line 32, "G'$_{110}$to" should read --G'$_{110}$ to--; and
Line 67, "(4)," should read --(4).--.

COLUMN 50:

Line 58, "rigion" should read --region--; and
Line 64, "a of" should read --of a--.

Signed and Sealed this

Twenty-sixth Day of September, 2000

Attest:

Q. TODD DICKINSON

Attesting Officer     Director of Patents and Trademarks